US011164163B1

(12) United States Patent
Viidu

(10) Patent No.: US 11,164,163 B1
(45) Date of Patent: Nov. 2, 2021

(54) PERFORMANCE OPTIMIZED AUTOMATED PROCESSING AND ROUTING SYSTEM

(71) Applicant: Electronic Arts Inc., Redwood City, CA (US)

(72) Inventor: Siim Viidu, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 1024 days.

(21) Appl. No.: 15/080,449

(22) Filed: Mar. 24, 2016

(51) Int. Cl.
*G06Q 40/00* (2012.01)
*G06Q 20/02* (2012.01)
*G06Q 10/06* (2012.01)

(52) U.S. Cl.
CPC ..... *G06Q 20/027* (2013.01); *G06Q 10/06393* (2013.01)

(58) Field of Classification Search
CPC .............. G06Q 20/027; G06Q 10/06393
See application file for complete search history.

(56) References Cited

U.S. PATENT DOCUMENTS

| 6,999,943 | B1 * | 2/2006 | Johnson | G06Q 20/10 |
| | | | | 705/35 |
| 9,911,110 | B2 * | 3/2018 | Scott | G06Q 20/325 |
| 10,037,506 | B2 * | 7/2018 | Mole | G06Q 10/06393 |
| 2007/0246528 | A1 * | 10/2007 | Kubo | G06Q 20/40 |
| | | | | 235/380 |
| 2009/0154684 | A1 * | 6/2009 | Dampier | H04M 3/5232 |
| | | | | 379/265.02 |
| 2012/0271765 | A1 * | 10/2012 | Cervenka | G06Q 20/32 |
| | | | | 705/44 |

(Continued)

FOREIGN PATENT DOCUMENTS

WO   WO-2012051582 A2 *   4/2012   ............. G06Q 20/40

OTHER PUBLICATIONS

Qureshi et al: "Evolution of Prepaid Payment Processor's Software Architecture—An Empirical Study", 2012 10th International Conference on Frontiers of Information Technology, IEEE Conference Paper, publication date Dec. 1, 2012 (Year: 2012).*

*Primary Examiner* — Edward J Baird
(74) *Attorney, Agent, or Firm* — Knobbe, Martens, Olson & Bear, LLP

(57) ABSTRACT

Embodiments of a transaction processing system are disclosed that can utilize a transaction processing model to process a transaction request through one or more transaction routes. In some embodiments, the transaction process system may obtain information regarding the characteristics of a set of transaction requests, transaction routes utilized to process those transaction requests, and information regarding whether attempts to process those transaction requests were successful. Using this information, the transaction process system may generate a transaction processing model. After generating the transaction processing model, the transaction process system may receive a transaction request. In response, the transaction process system may determine characteristics of the transaction request and may apply those characteristics to the transaction processing model to determine a set of processing routes. The transaction process system may then utilize the set of processing routes in one or more attempts to process the transaction request.

17 Claims, 9 Drawing Sheets

(56) References Cited

U.S. PATENT DOCUMENTS

| | | | |
|---|---|---|---|
| 2013/0073744 A1* | 3/2013 | Ratica | G06F 9/4451 |
| | | | 709/240 |
| 2013/0218694 A1* | 8/2013 | Kingston | G06Q 20/405 |
| | | | 705/16 |
| 2014/0012747 A1* | 1/2014 | Nyman | G06Q 30/04 |
| | | | 705/40 |
| 2014/0180924 A1* | 6/2014 | Ozvat | G06Q 20/20 |
| | | | 705/44 |
| 2014/0337089 A1* | 11/2014 | Tavares | G06Q 20/30 |
| | | | 705/7.29 |
| 2017/0017935 A1* | 1/2017 | Beaudoin | G06Q 20/027 |
| 2017/0243207 A1* | 8/2017 | Lorberg | G06Q 20/40 |
| 2017/0364915 A1* | 12/2017 | Levy | H04L 67/42 |

\* cited by examiner

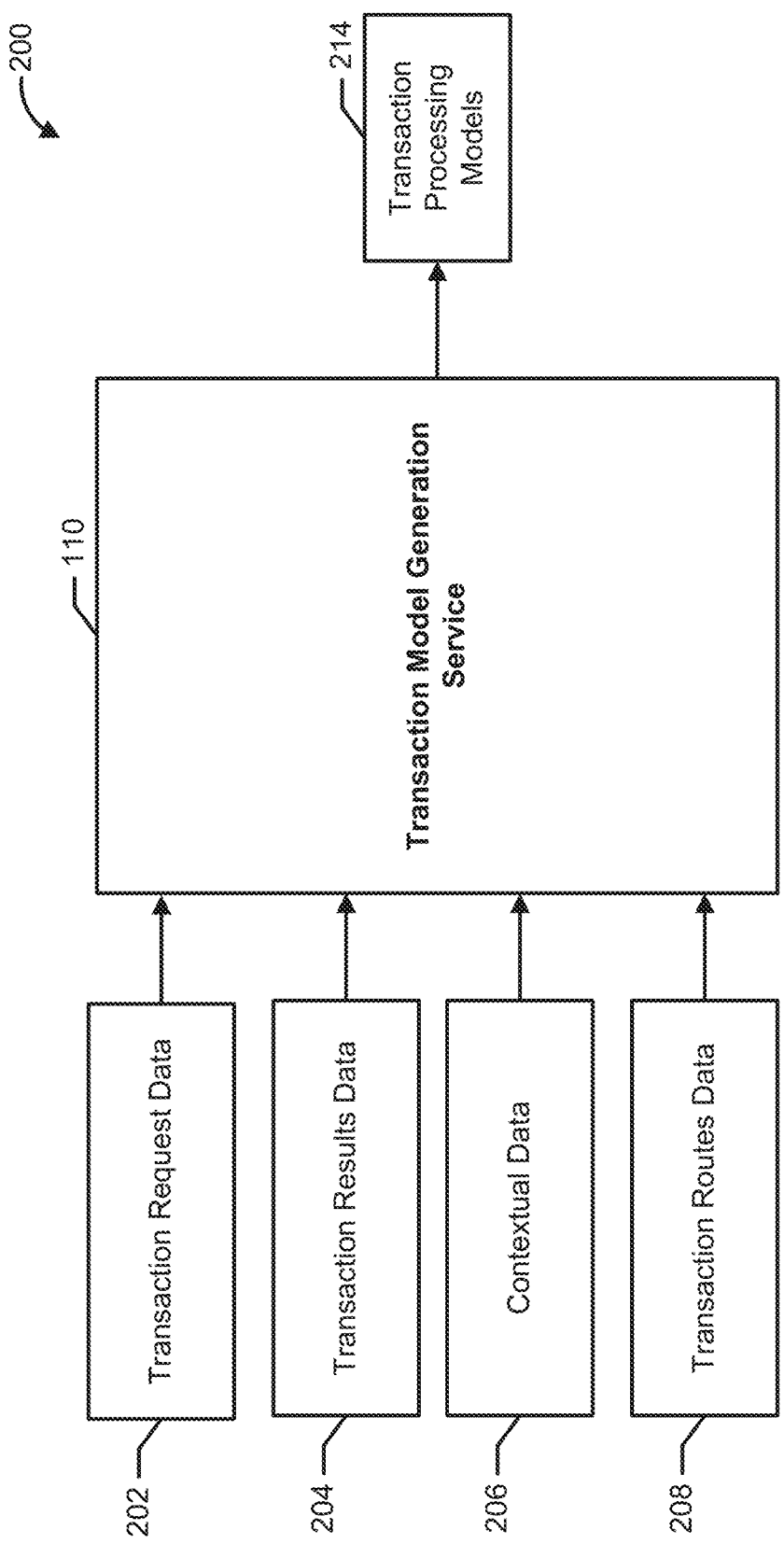

PERFORMANCE OPTIMIZED AUTOMATED PROCESSING AND ROUTING SYSTEM

BACKGROUND

Systems that process transactions can have various difficulties that cause transactions to fail. A transaction may fail to convert for due to characteristics or factors of associated with the transaction. By way of non-limiting examples, some factors that may affect the success or failure of conversion of a transaction may include one or more of the following related to the transaction: the gateway, the provider, the type of transaction, the time of day, the date, a recurring transaction, a non-recurring transaction, a pre-authorization transaction, an authorization transaction, scheduled or unscheduled network outages, and/or the like.

SUMMARY OF EMBODIMENTS

The systems, methods, and devices of this disclosure each have several innovative aspects, no single one of which is solely responsible for the all of the desirable attributes disclosed herein.

Various embodiments may include a system that includes a server having a processor configured with processor-executable instructions to perform operations that include receiving, from a first computing device, a transaction request, determining a set of characteristics related to the transaction request, accessing a transaction processing model that includes information regarding a plurality of sets of transaction routes available for use in converting transaction requests, wherein each set of transaction routes is associated with one or more likelihood values indicating likelihood of successfully converting one or more transaction requests based at least in part on characteristics of the one or more transaction requests, determining a set of transaction routes from the transaction processing model and the set of characteristics related to the transaction request, sending the transaction request to a second computing device according to a transaction route of the set of transaction routes, receiving, from the second computing device, transaction results regarding the transaction request, performing an analysis of the transaction results based, at least in part, on benchmark metrics, generating user interface instructions for display of the transaction results and the analysis of the transaction results using the benchmark metrics, and sending the user interface instructions to the first computing device for presentation.

Various embodiments include a computer-implemented method for receiving, from a first computing device, a transaction request, determining a set of transaction routes from a transaction processing model and a set of characteristics related to the transaction request, sending the transaction request to a second computing device according to a transaction route of the set of transaction routes, receiving, from the second computing device, transaction results regarding the transaction request, performing an analysis of the transaction results based, at least in part, on benchmark metrics associated with the set of transaction records, generating user interface instructions for display of the transaction results and the analysis of the transaction results using the benchmark metrics, and sending the user interface instructions to the first computing device for presentation. In some embodiments, the method may further include modifying the transaction processing model based at least in part on the analysis of the transaction results.

Various embodiments may also include a non-transitory, computer-readable medium having stored thereon computer-executable software instructions configured to cause a processor of a first computing device to perform operations that include receiving, from a first computing device, a transaction request, determining a set of transaction routes from a transaction processing model and a set of characteristics related to the transaction request, sending the transaction request to a second computing device according to a transaction route of the set of transaction routes, receiving, from the second computing device, transaction results regarding the transaction request, performing an analysis of the transaction results based, at least in part, on benchmark metrics associated with the set of transaction records, generating user interface instructions for display of the transaction results and the analysis of the transaction results using the benchmark metrics, and sending the user interface instructions to the first computing device for presentation.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2A is an embodiment of a block diagram illustrating generating a transaction processing model by a transaction processing model generation service.

DETAILED DESCRIPTION OF EMBODIMENTS

Figure 1:
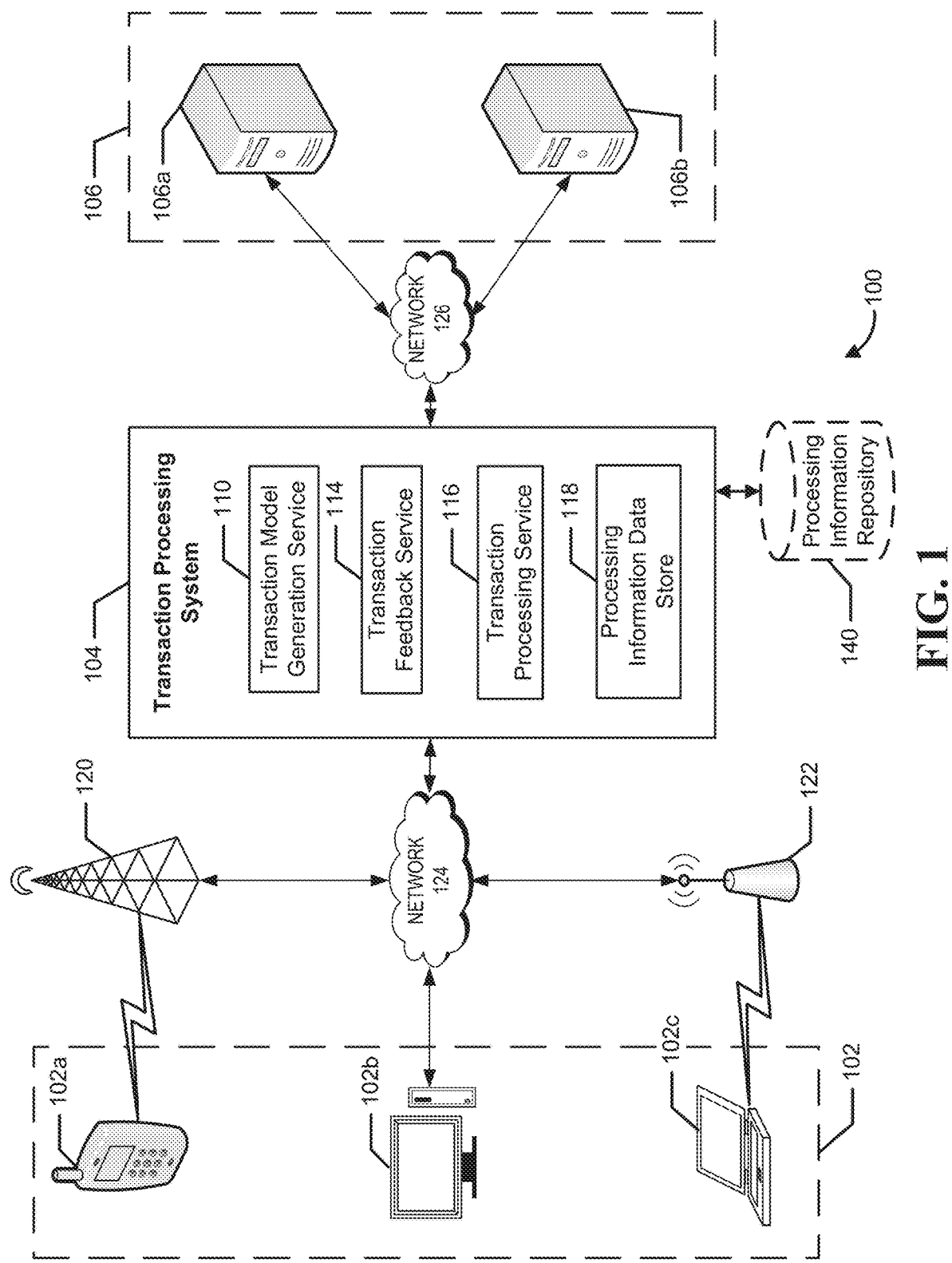
FIG. 1 is an embodiment of a communication system block diagram of a network suitable for use with some embodiments.

The present disclosure provides a system for automated processing and routing of transactions. When routing and processing transactions, a transaction may fail to convert for one or more reasons that may be attributable, at least in part, to one or more characteristics of the transaction, circumstances surrounding the transaction, the transaction route by which the information is provided over a network to the system that would process the transaction, and/or the particular system that would receive the transaction. In a suboptimal solution to remedy transactions that have failed to convert, some systems will reattempt to process the transaction by sending the transaction to the same financial system—or, alternatively, to one or more other financial systems—until the transaction finally converts or until the transaction has failed to convert after a threshold number of attempts. However, such systems typically do not diagnose the reasons for failed attempts or discover patterns of failed and successful attempts. Instead, these systems typically reference a predetermined order of financial systems that guides reattempts. Thus, these systems usually must send a transaction to one or more financial systems several times before the transaction is successfully converted. Because systems must utilize a certain amount of processing and network resources for each attempt to process a transaction, each additional attempt will increase the overall amount of processing and resources needed to complete a transaction. As such, systems that implement the above suboptimal solution to convert a transaction often experience reduced processing performance and slower network communications. Further, because some systems may process hundreds or even thousands of transactions every day, the processing and network costs associated with making multiple attempts to convert each transaction may be substantial.

In overview, aspects of the present disclosure include embodiments of systems and methods for processing a transaction that overcome the technical limitations of current systems (for example, as described above) by reducing the overall processing and network resources required to convert a transaction successfully over time. In some embodiments, a transaction processing system may observe the conversion rate of various types of transactions sent to various financial systems over a period of time. Specifically, the transaction processing system may determine characteristics of transaction requests and may observe whether those transaction requests are converted using one or more transaction routes. Based on these observations, the transaction processing system may generate a transaction processing model that describes one or more transaction routes that are observed to have relatively high conversion rates for transactions having one or more particular characteristics. As such, the transaction processing system may utilize the transaction processing model to process a transaction request by determining the characteristics of the transaction request and identifying one or more transaction routes in the model that correspond to the characteristics of the transaction processing model.

As used herein, the term "transaction request" refers generally to a request from a user computing device to conduct a transaction between a user of the user computing device and another entity, such as a vendor, seller, financial institution, or the like. As described herein, the transaction processing system may receive a transaction request from a user computing device and may make one or more attempts to convert the transaction request by providing the transaction request to one or more financial systems (for example, banks, acquirers, payment processors, or the like). A transaction request may be associated with various characteristics indirectly related to the underlying transaction or directly related to the transaction request. These characteristics may include, but are not limited to: a transaction type, an intended acquirer, a payment processor or gateway, a type of card used to make the transaction, an issuer of such a card, a location in which such a card is issued, whether such card is a pre-paid card, whether the requested transaction is an authorization transaction or a pre-authorization transaction, a type of currency associated with the transaction, an amount of currency associated with the transaction, a time of day at which the transaction request is made or received, a date on which the transaction request is made or received, or the like.

As also used herein, the term "transaction route" may refer to a path, route, or way in which the transaction processing system provided a transaction request to a financial system. Generally described, the transaction route may include information related to how the transaction processing system will send a transaction request to a financial system. For example, sending a transaction request via a first transaction route may entail sending the transaction request to a particular financial system at a certain time, and sending the transaction request via a second transaction route may entail sending the transaction request to a different financial system at the same (or different) time. As further described, the transaction processing model may generate a transaction processing model that includes information indicating one or more transaction routes that have the highest likelihood of resulting in a successful conversion of a transaction request in light of at least the characteristics of the transaction request.

In some embodiments, the transaction processing system may generate a transaction processing model from a set of transaction data obtained by the transaction processing system. The set of transaction data may include information related to attempts to convert a plurality of transaction requests. Specifically, for each transaction request of the plurality of transaction requests, the set of transaction data may include information related to the characteristics of the transaction request (sometimes referred to herein as "transaction request data") and information related to the result of the attempt to convert the transaction request (sometimes referred to herein as "transaction results data"). In a non-limiting example, the set of transaction data may include information that a non-recurring, debit-card transaction request was provided to a particular acquirer via a particular transaction route and that the transaction request failed to convert. The set of transaction data may also include similar information for each attempt to convert the transaction request and/or information about more than one attempt to convert the same transaction request. Further, in some embodiments, the set of transaction data may include information related to external performance data related to the financial system to which the transaction request was provided, the characteristics of the network over which the transaction request is provided to the financial system, or the like. For ease of description, this external information may be referred to collectively as "contextual data" or "external performance data." While the above description of the set of transaction data refers to information related to a transaction request, the set of transaction data may include similar information for each of the plurality of transaction requests.

In some embodiments, the transaction processing system may obtain the set of transaction data over time based on a plurality of attempts to convert transaction requests. Specifically, the transaction processing system may determine the transaction request data, transaction results data, and external performance data for each of a plurality of transaction requests that the transaction processing system processes. The transaction processing system may attempt to convert each of the plurality of transaction requests one or more times and may store information regarding the success or failure of each of the one or more attempts to convert each of the plurality of transaction requests. In some alternative (or additional) embodiments, the transaction processing system may obtain the set of transaction data from one or more other transaction processing systems. In such embodiments, transaction processing systems may pool their individual transaction information to generate a combined set of transaction data that reflects the varied experiences of each of those transaction processing systems. As such, a transaction processing system may benefit from the information obtained by one or more other transaction processing systems.

In some embodiments, the transaction processing system may generate a transaction processing model from the set of transaction data using one or more machine learning techniques. The transaction processing system may utilize the information included in the set of transaction data to identify the likelihood that a transaction request will be successfully converted in light of the various characteristics surrounding the transaction request. In an example, the transaction processing system may determine that recurring transaction requests provided to a particular financial system at a certain time of day have a relatively high likelihood of converting successfully. In some embodiments, the transaction processing system may, for each possible transaction request, determine a set of one or more transaction routes that may be associated with relatively high likelihoods of successful conversion. For example, the transaction processing system may determine that attempting to convert a transaction request using a first transaction route will likely fail but that using a second transaction route in a subsequent reattempt is associated with a relatively higher likelihood of successful conversions. Generating a transaction processing model is further described herein (for example, with reference to FIGS. 2A, 2B, and 3).

In some embodiments, the transaction processing system may utilize the transaction processing model to process one or more transaction requests that are received, for example, from one or more user computing devices. Specifically, in response to receiving a transaction request, the transaction processing system may determine the characteristics related to the transaction request. In some embodiments, the transaction processing system may organize the characteristics into a data structure that may be compared, applied, or otherwise used with the transaction processing model. For example, the transaction processing system may generate a feature vector representative of the transaction. Generally described, the transaction processing system may apply the characteristics as input to the transaction processing model and may determine a set (for example, one or more) of transaction routes as output of the transaction processing model. In the above example, the feature vector may be a one dimensional array of values corresponding to various characteristics or traits that may be used as input to identify a set of transaction routes included in the transaction processing model. In some embodiments, in response to identifying a set of transaction routes in the model based on the transaction request, the transaction processing system may make one or more attempts to convert the transaction request using one or more of the set of transaction routes. Utilizing a transaction processing model to process a transaction request is further described herein (for example, with reference to FIGS. 2C, 2D, and 4).

In some embodiments, the transaction processing system may monitor or measure the results of attempts to convert a transaction request using a set of transaction routes identified from the transaction processing model. Specifically, the transaction processing system may determine that one or more transaction routes are performing better or worse than expected based on a likelihood of success included in the model. In such embodiments, the transaction processing system may update the transaction processing model to reflect the results of utilizing the transaction processing model to convert transaction requests. By way of an example, the transaction processing system may determine that the transaction processing model indicates that utilizing a particular transaction route for a type of transaction is relatively likely to succeed (for example, an 80% predicted chance of success), but the transaction processing system may determine that actual attempts to convert that type of transaction request is substantially less than the indicated likelihood of success (for example, a 20% actual chance of success). Thus, in some embodiments, the transaction processing system may modify the transaction processing model to reflect observed results of utilizing the transaction processing model to process transaction request. As used herein, "modifying" a transaction processing model may refer to either generating a new model (for example, using updated data) or modifying the existing transaction processing model.

The transaction processing system may generate information (for example, in the form of user interface information) that the transaction processing system may provide to a user computing device in response to receiving a transaction request from that user computing device. In some embodiments, the transaction processing system may determine a set of transaction routes from the transaction processing model based on the transaction request received from the user computing device. The transaction processing system may determine that the set of transaction routes indicates that the likelihood of converting the transaction request is low (for example, below a threshold likelihood). In response, the transaction processing system may generate user interface information to alert the user of the user computing device that the likelihood of successfully converting the transaction request is low. In some embodiments, the transaction processing system may determine alternative characteristics that would cause the transaction request to have a higher likelihood of being converted successfully. By way of an example, the transaction processing system may determine that a transaction request received during the middle of the day is associated with a first set of transaction routes that may provide a low likelihood of successfully converting the transaction request. However, in this example, the transaction processing system may determine that a second set of transaction routes associated with processing transaction requests at midnight may provide a higher likelihood of successfully processing the transaction request. As such, the transaction processing system may generate user interface information alerting the user to the fact that the user should wait until midnight to submit the transaction request, or alternatively, the transaction processing system may generate user interface information that requests authorization to wait to process the transaction until midnight.

The transaction processing system may also provide feedback to a user in response to converting a transaction request successfully or unsuccessfully. In some embodiments, the transaction processing system may attempt to convert a transaction request according to a first transaction route that may have a high (or the highest) likelihood of successfully converting the transaction request. In the event that the transaction processing system is unable to convert the transaction request successfully using the first transaction route, the transaction processing system may identify one or more alternative transaction routes that may offer relatively high likelihoods of successfully converting the transaction request in light of the failure to convert the transaction request using the primary transaction route. The transaction processing system may provide information regarding these one or more alternative transaction routes (for example, respective likelihoods of converting the transaction request successfully) to the user. For example, the first transaction route may correspond to a first payment type, and the transaction processing system may identify an alternative transaction route corresponding to a second payment type that may have a relatively high likelihood of converting the transaction request successful. The user may then provide the transaction request with a selection from those one or more alternative transaction routes, and in response, the transaction processing system may attempt to convert the transaction route using the one or more alternative transaction routes that the user selected.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the disclosure.

I. Overview of Transaction Processing System

FIG. 1 is a functional block diagram of an embodiment of illustrative environment 100 suitable for implementing aspects of the present disclosure. The environment 100 may include one or more user computing devices (for example, user computing devices 102), a transaction processing system 104, and one or more financial systems (for example, financial systems 106).

A. User Computing Devices

FIG. 1 illustrates various examples of user computing devices 102. For example, the user computing devices 102 may include mobile communication devices 102a, such as a smart phone or tablet, stationary computing devices 102b, such as a desktop or personal computer or workstation, and portable user computing devices 102c, such as a laptop computer. The user computing devices 102 may be any electronic computing device configured to provide the transaction processing system with a transaction request, such as in relation to purchasing an item from an electronic marketplace managed by the transaction processing system 104. Such user computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and/or the like. Further, for ease of description, the example illustrated in FIG. 1 includes three user computing devices 102. However, the environment 100 may include one or more user computing devices without loss of scope.

The user computing devices 102 may include hardware and software components for establishing communications over the network 124. For example, the user computing devices 102 may be equipped with networking equipment and network software applications (for example, a web browser) that facilitate communications via the network 124. As such, the computing devices 102 may each communicate with the transaction processing system 104 by exchanging data and other information via a network 124. In an example, the client device 102a may communicate over the network 124 via a cellular link to a cellular base station 120 that may maintain a wired link to the network 124. The computing device 102b may send communications directly to the network 124 via a wired link. The computing device 102c may communicate through the network 124 via a wireless connection to a wireless access point 122 (for example, a wireless router) that communicates with the network 124 via a wired link. In some embodiments, the network 124 may route or forward transaction requests from the client devices 102 to the transaction processing system 104 via a communication link.

B. Transaction Processing System

In some embodiments (for example, as illustrated in FIG. 1), the transaction processing system 104 may include a transaction processing model generation service 110, a transaction feedback service 114, a transaction processing service 116, and a processing information data store 118.

1. Processing Information Data Store

The processing information data store 118 may include various types of information that may be utilized by one or more of: the transaction processing model generation service 110, the transaction feedback service 114, the transaction processing service 116. In some embodiments, the processing information data store 118 may include information regarding transaction routes that the transaction processing service 116 is allowed to use or capable of utilizing when processing a transaction request. As described, a transaction route may indicate a path or way by which the transaction processing service 116 provides a transaction request to a financial system. Additionally, the transaction route may reflect a type of transaction (for example, recurring, non-recurring, authorization, pre-authorization, or the like) associated with the transaction request and a payment instrument associated with the transaction request. By way of an example, the processing information data store 118 may include information that indicates that a non-recurring transaction request for a credit card transaction may be provided to the financial system 106a. By way of an example, the processing information data store 118 may include or describe payment instruments for which the transaction processing system 104 is able or permitted to utilize as part of processing transaction requests. In another example, the processing information data store 118 may include information indicating that the transaction processing system 104 is authorized to utilize credit card payment instruments with one or more financial institutions (for example, one or more of the financial systems 106) and is authorized to utilize debit card payment instructions with one or more of the same or different financial institutions. In some embodiments, information stored in the processing information data store 118 may also or alternatively be stored in an external processing information repository 140.

2. Transaction Processing Service

In some embodiments, the transaction processing service 116 may, over time, participate in building a set of transaction data related to transaction requests. Specifically, the transaction processing service 116 may receive transaction requests from one or more of the user computing devices 102 over the network 124. In response to receiving a transaction request, the transaction processing service 116 may determine characteristics of the transaction request, such as the intended financial system, vendor, user information, a time at which the transaction request is received, and/or the like. The transaction processing service 116 may select a possible transaction route from a set of transaction routes (for example, as described in information stored in the processing information data store 118) and may send the transaction request to one of the financial systems 106 through the selected transaction route. For example, the transaction processing service 116 may determine that the characteristics of a transaction request received from the user computing device 102a correspond to a transaction route that the transaction processing service 116 may use to send the transaction request to the financial system 106a.

In response to receiving a transaction request, a financial system may determine whether to approve or reject the transaction request and may provide an indication to the transaction processing service 116 regarding the determination. In the event that the transaction request converts, the transaction processing system 104 may send data that includes an indication to the user computing device associated with the transaction request that the transaction request was successfully converted. In the event that the transaction request does not convert, the transaction processing system 104 may attempt to process the transaction request via the same or another available transaction route. For example, the transaction processing system 104 may provide the transaction request to the same financial system or to another financial system. In some embodiments, the transaction processing system 104 may determine that a transaction request has failed in the event that a response is not received from the financial systems 106 within a threshold period of time.

In some embodiments, the transaction processing service 116 may provide the determined characteristics of each received transaction request and the result of providing each transaction request to a financial system to the transaction processing model generation service 110. Optionally, the transaction processing service 116 may further provide the transaction processing model generation service 110 with information related to various characteristics of the financial system, the network over which the transaction processing service 116 provided the transaction request, or the like. As such, over time, the transaction processing service 116 may provide the transaction processing model generation service 110 with information regarding the characteristics of various types of transaction requests, the transaction routes utilized to process those transaction requests, and/or the result of utilizing those transaction routes to process those transaction requests.

3. Transaction Processing Model Generation Service

The transaction processing model generation service 116 may utilize the set of transaction data to generate a transaction processing model. In some embodiments, the transaction processing model generation service 110 may use one or more machine learning algorithms to generate the transaction processing model. The machine learning algorithms can be configured to adaptively develop one or more transaction processing models based on input data sets along with one or more desired outcome criteria. The inputs for the machine learning algorithms may include aggregated historical data related to characteristics of transaction requests, results of transaction request attempts, contextual performance data (for example, performance of the network 126 or the financial systems 106), information regarding available or possible transaction routes, and/or other inputs.

Some examples of machine learning algorithms that can be used to generate and update the transaction processing models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, individual models may be customized for individual types of transaction requests. For example, the transaction processing model generation service 110 may generate a transaction processing model by determining characteristics and patterns of operation associated with a particular type of transaction request. In some embodiments, the transaction processing model generation service 110 may generate a generic or base model. The base model may be used as a starting point to generate additional models specific to a type of transaction request. In some embodiments, the transaction processing model generation service 110 may utilize a plurality of techniques to generate models for analysis of a set of transaction data. For example, human pattern recognition can be used to identify transaction routes that correspond to transaction routes that have a certain likelihood of success for particular transaction request types. In some embodiments, statistical methods can be employed to identify transaction routes that correspond to relatively high likelihoods of successfully converting one or more types of transaction requests. Other techniques may include using pre-defined thresholds or data values. Further, the transaction processing model generation service 110 may continue to update the transaction processing model based on additional information received from the transaction processing service 116.

In some embodiments, the transaction processing service 116 may utilize the transaction processing model generated by the transaction processing model generation service 110. Specifically, the transaction processing service 116 may apply the generated model to a transaction request that is received from a user computing device in order to determine a set of transaction routes that may be used to process the received transaction request. In some embodiments, the transaction processing service 116 may utilize the transaction processing model to select a set of routes associated with a highest likelihood (or highest likelihoods) of successfully converting the received transaction request. For example, the transaction processing service 116 may identify one or more transaction routes that historically been used to successfully convert transaction requests that are similar to or the same as the received transaction request. In some embodiments, the transaction processing service 116 may generate a score for the transaction routes represented in the transaction processing model (for example, example a value between 1 and 100). The transaction processing service 116 may then select one or more transaction routes having the highest score. In some embodiments, the transaction processing service 116 may select the best route. In some embodiments, the transaction processing service 116 may compare the received transaction request to the transaction processing model to determine a classification or category of transaction requests that may be associated with the received transaction request. In such embodiments, the transaction processing service 116 may select one or more transaction routes that are associated with that classification or category of transaction request and that may have a relatively high likelihood of leading to successful conversions when used to process transaction requests within that classification or category.

4. Transaction Feedback Service

The transaction feedback service 114 may generate reports (for example, in the form of user interface information) associated with the analysis performed on a transaction request received from a user computing device. In some embodiments, the transaction feedback service 114 may generate information that can be provided to a user associated with the received transaction request. For example, transaction feedback service 114 can generate encrypted alert user interface information configured to be displayed on a user computing device. In some embodiments, the information can include a description of the received transaction request in the event that there is a likelihood of successfully converting the received transaction that is less than a threshold likelihood (for example, less than 20%). The information can also include reasons that the transaction request may not be converted successfully. For example, the information may indicate that the set of transaction routes associated with the transaction request is associated with a low likelihood of successfully converting a transaction request similar to the received transaction request. The information may be configured to be sent to the user computing device via email, SMS, or other communication channels. In some embodiments, the transaction feedback service 114 may provide information to the user computing device associated with the received transaction request that indicates remedial steps that the user of the user computing device may perform to increase the likelihood of successfully converting a transaction request. For example, the information may indicate that, given the time of day, a transaction request that is associated with a different payment type (for example, credit versus debit) would have a higher likelihood of being converted successfully.

C. Networks

The networks 124 and 126 may be wired networks, wireless networks, or combinations thereof. In addition, the networks 124 and 126 may be personal area networks, local area networks, wide area networks, cable networks, satellite networks, cellular telephone networks, etc. or combinations thereof. In addition, the networks 124 and 126 may be personal area networks, local area networks, wide area networks, over-the-air broadcast networks (for example, for radio or television), cable networks, satellite networks, cellular telephone networks, or combinations thereof. For example, networks 124 and 126 may be publicly accessible networks of linked networks, possibly operated by various distinct parties, such as the Internet. In some embodiments, the networks 124 and 126 may be private or semi-private networks, such as a corporate or university intranets. The networks 124 and 126 may include one or more wireless networks, such as a Global System for Mobile Communications (GSM) network, a Code Division Multiple Access (CDMA) network, a Long Term Evolution (LTE) network, or some other type of wireless network. The networks 124 and 126 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

D. Financial Systems

The example illustrated in FIG. 1 includes financial systems 106 in communication with the transaction processing system via the network 126. In some embodiments, the financial systems 106 may include one or more computing devices that may be involved in handling, approving, or otherwise processing a transaction request by one or more financial institutions. By way of an example, the financial systems 106 may include computing systems of banking institutions (such as acquiring banks and/or issuing banks), credit card associations, fraud-prevention entities, and/or the like. Generally, each of the financial systems 106 may be any electronic computing devices configured to receive and process (at least in part) a transaction request, such as by approving a transfer of funds from a user account to a vendor account as indicated in in the transaction request. By way of some non-limiting examples, the financial systems 106 may include, but are not limited to servers, computing devices within a hosted computing environment, clusters of computing devices, and/or the like. Further, for ease of description, the example illustrated in FIG. 1 includes two financial systems 106a and 106b. However, the environment 100 may include one or more financial systems without loss of scope.

As described above, the financial systems 106 may receive one or more transaction requests from the transaction processing system 104. In response, the financial systems 106 may analyze the transaction request in order to determine whether to convert the transaction request. In an example, a financial system may identify a user's banking account and a transaction amount associated with the transaction request and may determine whether the user's banking account has sufficient funds to cover the transaction amount. In some other examples, the financial system may determine whether to convert the transaction request based on a credit limit associated with user, a fraud analysis of the transaction request, and/or various other factors. In response to determining not to convert a transaction request received from the transaction processing system 104, the financial systems 106 may provide a response notification to the transaction processing system 104 indicating that the attempt to convert the transaction request has failed or has been rejected. Optionally, the financial systems 106 may provide a reason for the rejection of the transaction request. In response to determining to convert the transaction request, the financial systems 106 may convert the transaction request and may provide a message to the transaction processing system 104 indicating that the transaction request has been converted successfully.

In some embodiments (not shown), more than one of the financial systems 106 may participate in processing an individual transaction request. In some examples, a financial system of an issuing banking institution may collaborate with a financial system of an acquiring banking institution to determine whether to convert a transaction request. In such embodiments, one or more of the financial systems working together may be in communication with the transaction processing system 104 and may provide feedback to the transaction processing system 104 regarding processing of transaction requests. In some embodiments, more than one financial system may exchange information, but only a subset of the more than one financial system may determine whether to approve or convert a transaction request. For example, a financial system of an issuing banking institution may merely conduct payment authorization while the financial system of an acquiring banking institution ultimately determines whether to approve or convert the transaction request. In other embodiments, the transaction request may be converted only after each of the more than one financial system individually approves the transaction request. Specifically, a first financial system may receive a transaction request and may determine whether to approve the transaction request. For example, the first financial system may perform a risk analysis on the transaction request and may determine, based on that analysis, whether to reject the transaction request. In response to approving the transaction request, the first financial system may provide the transaction request to a second financial system. The second financial system may then determine whether to approve the transaction request. This process may continue until each of the more than one financial systems approves the transaction request or until one of the financial systems rejects the transaction request.

II. Transaction Processing Model Generation

FIG. 2A illustrates an embodiment of the transaction processing model generation service 110 configured to generate a transaction processing model 124. The model generation service 110 may generate the transaction processing model 214 based, at least in part, on inputs received from or obtained from the transaction processing service 116 and the processing information data store 118. The input information may include transaction request data 202, transaction results data 204, contextual data 206, and transaction routes data 208, as further described herein.

In some embodiments, the transaction request data 202 may include information regarding one or more transaction requests that have been received by the transaction processing service 116 (for example, as described above with reference to FIG. 1). Specifically, the transaction request data 202 may include information regarding the characteristics of the transaction requests. In a non-limiting example, the transaction request data 202 may indicate, for each transaction request: a payment type, an intended acquirer, a type of card used to make the transaction, an issuer of such a card, a location in which such a card is issued, whether such card is a pre-paid card, whether the requested transaction is an authorization transaction or a pre-authorization transaction, a type of currency associated with the transaction, an amount of currency associated with the transaction, a time of day at which the transaction request is made or received, a date on which the transaction request is made or received, or the like.

The transaction results data 204 may include data related to results of attempts to convert the transaction requests described in the transaction request data 202. Specifically, transaction processing service 116 may have attempted to process each of the transaction requests described in the transaction request data 202 by providing those transaction requests to one or more financial systems (for example, as described above). The transaction processing service 116 may receive results from the one or more financial systems indicating whether the attempts to convert the transaction requests succeeded or failed. In some embodiments, the transaction results data 204 may include information regarding one or more attempts to convert each transaction request described in the transaction request data 202. By way of an example, the transaction processing service 116 may have attempted to convert a transaction request three times before the transaction processing service 116 received an indication that an attempt to convert the transaction request had succeeded. In this example, the transaction processing service 116 may provide information related to each attempt to convert the transaction request to the transaction processing model generation service 110 by way of the transaction results data 204.

In some embodiments, the transaction routes data 208 may include information regarding a set of transaction routes that the transaction processing service 116 used when attempting to convert the transaction requests described in the transaction request data 202. Specifically, the transaction routes data 208 may indicate a transaction route that the transaction processing service 116 utilized in an attempt to convert a corresponding transaction request. In some embodiments, each attempt of the transaction processing service 116 to convert a transaction request may be associated with the same or a different transaction route. As such, the transaction route data 208 may include multiple transaction routes corresponding to different attempts to convert the same transaction request described in the transaction request data 202.

The contextual data 206 may include information that is associated with one or more financial systems, networks, and/or various other types of information that can provide context to attempts to process the transaction requests described in the transaction request data 202. By way of a non-limiting example, the contextual data 156 may describe a state or condition of a network (for example, the network 124 as described with reference to FIG. 1) at the time that the one or more transaction requests were provided to a financial system. Continuing with this example, the contextual data 206 may indicate that the financial system was unavailable due to routine maintenance. In another example, the contextual data 206 may include information related to external information that may have affected the success or failure to convert one or more transaction requests described in the transaction request data 202.

In some embodiments, the transaction model generation service 110 may utilize the transaction request data 202, the transaction results data 204, the transaction routes data 208, and the contextual data 206 to generate one or more transaction processing models 214. Specifically, the transaction processing model generation service 110 may utilize the transaction request data 202 to determine the characteristics of one or more transaction requests. The transaction processing model generation service 110 may then utilize the transaction results data 204 to match, map, or otherwise associate a transaction result with each transaction described in the transaction request data 202. Further, the transaction processing model generation service 110 may further associate each transaction request of the transaction requests with the transaction route used in the attempt to convert that transaction request. The transaction processing model generation service 110 may compile information describing the characteristics of a transaction, a transaction route used in an attempt to convert that transaction, and the result of that attempt. For example, the transaction processing model generation service 110 may determine that a non-recurring credit card transaction request that was sent to a particular financial system was successfully converted. While the above description refers to descriptions of transaction requests, in some embodiments, the transaction processing model generation service 110 may compile descriptions for each attempt to convert each transaction described in the transaction request data 202, according to some embodiments. For example, the transaction processing model generation service 110 may compile descriptions for a first unsuccessful attempt to convert a transaction request and a second attempt to convert the same transaction request. In these embodiments, the position of an attempt in the sequence of attempts may be included as a characteristic of the transaction request.

In some optional embodiments, the transaction model generation service 110 may also utilize the contextual data 206 to generate the one or more transaction processing models 214. Specifically, the transaction model generation service 110 may utilize the contextual data 206 to determine factors that may have impacted the conversion of a transaction request. In such embodiments, the transaction model generation service 110 may associate external characteristics (for example, availability of financial systems) with information regarding transaction requests, the characteristics of those transaction requests, the transaction routes utilizes with those transaction requests, and ultimately the transaction results of those transaction requests. By way of an example, the transaction model generation service 110 may identify that a financial system was unavailable during a period of time during a network outage and may associate that information with a transaction request that was sent to the financial system during that time and that failed to convert.

Based on the compiled information, the transaction processing model generation service 110 may generate the one or more transaction processing models 214 according to one or more machine learning algorithms or processes. For example, the transaction processing model generation service 110 may classify transaction requests that share the same or similar characteristics and may determine transaction routes that may have the highest likelihood of resulting in a successful conversion of transaction requests that also share the same or similar characteristics. For example, the transaction processing model generation service 110 may determine that attempts to convert recurring, authorization transaction requests are typically successful when processed using one or more transaction routes. Thus, as further described below, the transaction processing service 116 may utilize a transaction processing model that incorporates this information in order to select one or more transaction routes that may have the highest likelihood of leading to a successful conversion attempt of a recurring, pre-authorization transaction request received at a later time from a user computing device.

In some embodiments (as further described with reference to FIG. 5), the transaction processing model generation service 110 may utilize the transaction request data 202, the transaction results data 204, the contextual data 206, and/or the transaction routes data 208 to modify or update the transaction processing model 214 dynamically. For instance, the transaction processing model generation service 110 may receive contextual data that indicates that certain transaction routes are more or less likelihood to lead to successful attempts to convert transaction request having certain characteristics. For example, the contextual information 206 may indicate that attempts to convert transactions using transaction routes involving a financial system that has had a data breach are much less likely to succeed. In another example, the contextual data 206 may indicate that a financial system is scheduled to have routine maintenance during a period of time in the future, and the transaction processing model generation service 110 may utilize this contextual data 206 to temporarily reduce the likelihood that attempts to convert transaction requests using transaction routes that involve this financial system will succeed. As a result, these transaction routes may be deemphasized or not selected during this period of time in favor of other transaction routes that may not be affected by the unavailability of the financial system.

As a result of modifying or updating the transaction processing models 214, transaction routes described in the transaction processing models 214 may be emphasized or deemphasized to reflect additional data related to the actual performance of the transaction processing models 214. For example, additional transaction request data 202, transaction results data 204, and transaction routes data 208 may indicate that transaction routes described in the transaction processing models 214 are performing worse than predicted for a certain type of transaction request. As a result, the transaction processing model generation service 110 may decrease the likelihoods of success (or other scores) associated with those transaction routes in the model and/or may increase the likelihoods of success (or other scores) associated with other transaction routes that the additional data indicates may provide the highest likelihood of successfully converting that type of transaction request. Further, in some embodiments, rather than updating or modifying an existing transaction processing model, the transaction processing model generation service 110 may utilize the additional data, alone or in combination with previous data, to generate a new transaction processing model.

In a further embodiment, the contextual data 206 may include user preferences that may emphasize or deemphasize certain transaction routes. For example, a user computing device may provide user input, and the user input may indicate a preference for using certain transaction routes over other transaction routes. Accordingly, the transaction processing model generation service 110 may utilize the user input to modify the transaction routes that may be selected to process transaction request for that user. In some embodiments, the contextual data 206 may also, or alternatively, include prompted information received from the user computing device that may increase the likelihood that one or more transaction routes may be used to convert a transaction request successfully. By way of an example, the transaction processing model generation service 110 (or another component of the transaction processing system 104) may prompt the user computing device for the card verification code of the user to improve the likelihood that transaction routes used to process reoccurring, credit-card transaction requests will result in successful conversions of those transaction requests.

III. Example Transaction Processing Model

Figure 2B:
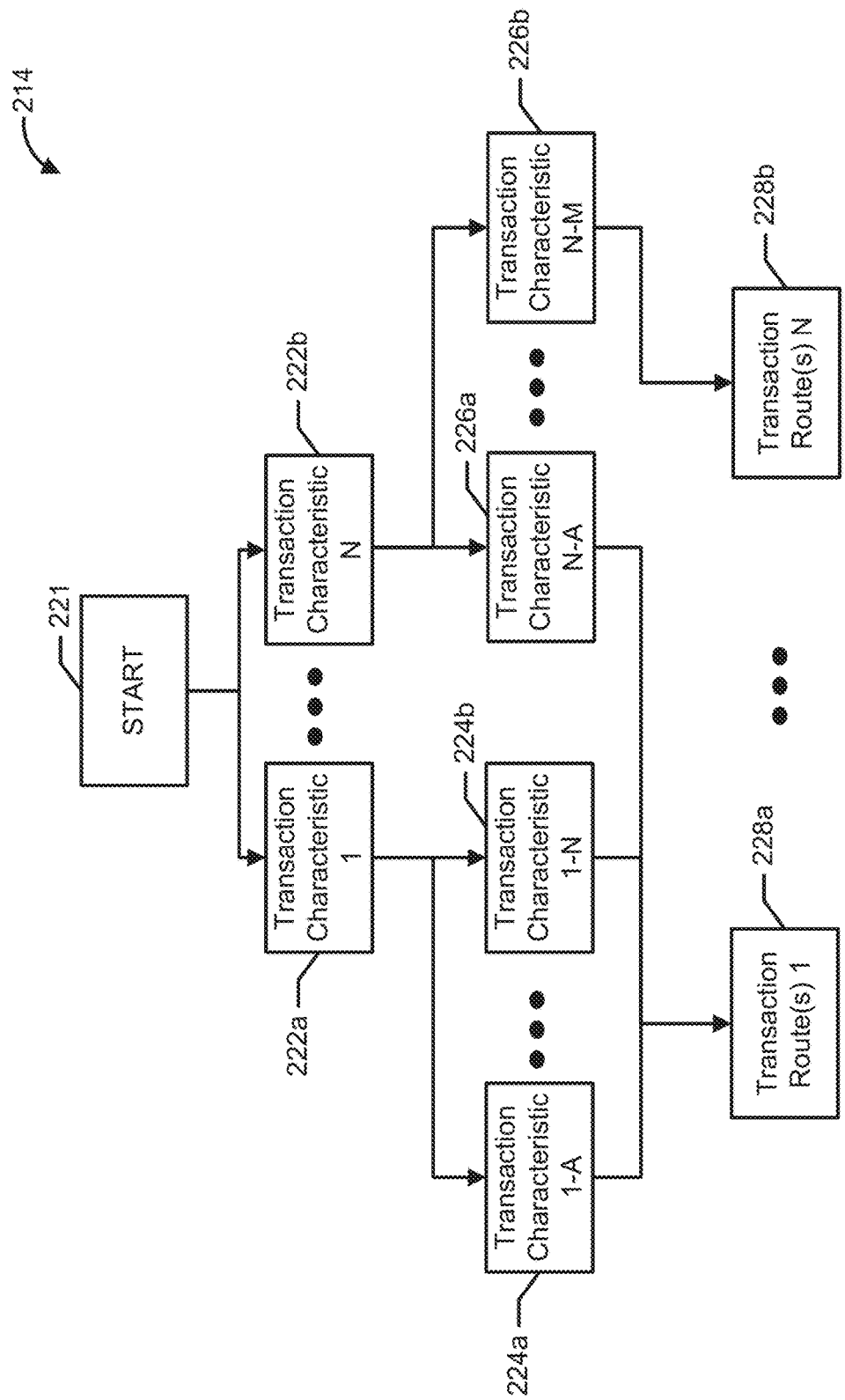
FIG. 2B is an embodiment of a block diagram of an example transaction processing model.

FIG. 2B illustrates an embodiment of the transaction processing model 214, according to some embodiments. As illustrated, the transaction processing model 214 may be represented in the form of a decision tree having multiple levels. Each level of the decision tree beneath a root 221 may correspond to a specific characteristic of a transaction request (for example, as described with reference to the transaction request data 202 in FIG. 2A). By way of an example, the root 221 may branch into two transaction request characteristics 222a and 222b. In this example, the transaction request characteristic 222a may correspond to a "recurring transaction," and the transaction request characteristics 222b may correspond to a "non-recurring transaction." The transaction request characteristic 222a may similarly branch into further transaction characteristics 224a and 224b, and the transaction request characteristics 222b may branch into the transaction characteristics 226a and 226b. Continuing with the above example, the transaction characteristics 224a and 224b may represent a type of payment instrument associated with a transaction request. Specifically, the transaction characteristic 224a may correspond with a credit card payment, and the transaction characteristics 224b may correspond with a debit card payment. The transaction characteristics 226a and 226b may correspond with a type of payment instrument or various other characteristics of a transaction request.

In some embodiments, paths through the transaction processing model 214 may be defined, at least in part, by dependencies between characteristics included in the levels expressed in the transaction processing model 214. In the example illustrated in FIG. 2B, paths that include the transaction characteristics 224*a* or 224*b* may be required to first pass through the transaction characteristic 222*a*, which is in a level that is closer to the root 221 than the level that includes the transaction characteristics 224*a* and 224*b*. In this example, a determination that a transaction request is associated with the transaction characteristic 222*a* may be considered a "precondition" for determining whether the transaction request is associated with either the transaction characteristic 224*a* or 224*b*. Further, in some embodiments, paths through the transaction processing model 214 may overlap, at least in part, such as when paths from different transaction characteristics converge. In the example illustrated in FIG. 2B, the transaction processing model 214 may include a first path through the transaction characteristic 224*b* and a second path through the transaction characteristic 226*a*. In this example, the first path and the second path overlap/converge at end of the decision tree corresponding to the set of transaction routes 228*a*.

In some embodiments, each end of the decision tree may correspond with one or more transaction routes. In the example illustrated in FIG. 2B, the illustrated paths of the decision tree may include two ends: an end in a first set of transaction routes 228*a* and an end in a second set of transaction routes 228*b*. In such embodiments, the sets of transaction routes 228*a* and 228*b* may indicate transaction routes that have been observed to have a relatively high (or the highest) likelihood of successful transaction request conversions for transaction requests that have the same or similar transaction characteristics represented in the decision tree (for example, as further described with reference to FIGS. 2C-2D). For ease of description, the decision tree representation of the transaction processing model 214 is illustrated as having two characteristic levels and two sets of transaction routes. However, in some embodiments, the decision tree representation of the transaction processing model 214 may have any number of transaction characteristics levels, paths, and resulting sets of transaction routes.

Further in some embodiments, the transaction characteristics represented in the decision tree representation of the transaction processing model 214 may represent external factors that may affect conversion of a transaction request. For example, the transaction characteristics may correspond to contextual information regarding the availability of one or more financial systems, users' preferences, and/or the like. In such embodiments, the contextual information may affect the path through the decision tree and, potentially, the identification of the resulting set of routing paths.

IV. Determination of Transaction Request Characteristics

Figure 2C:
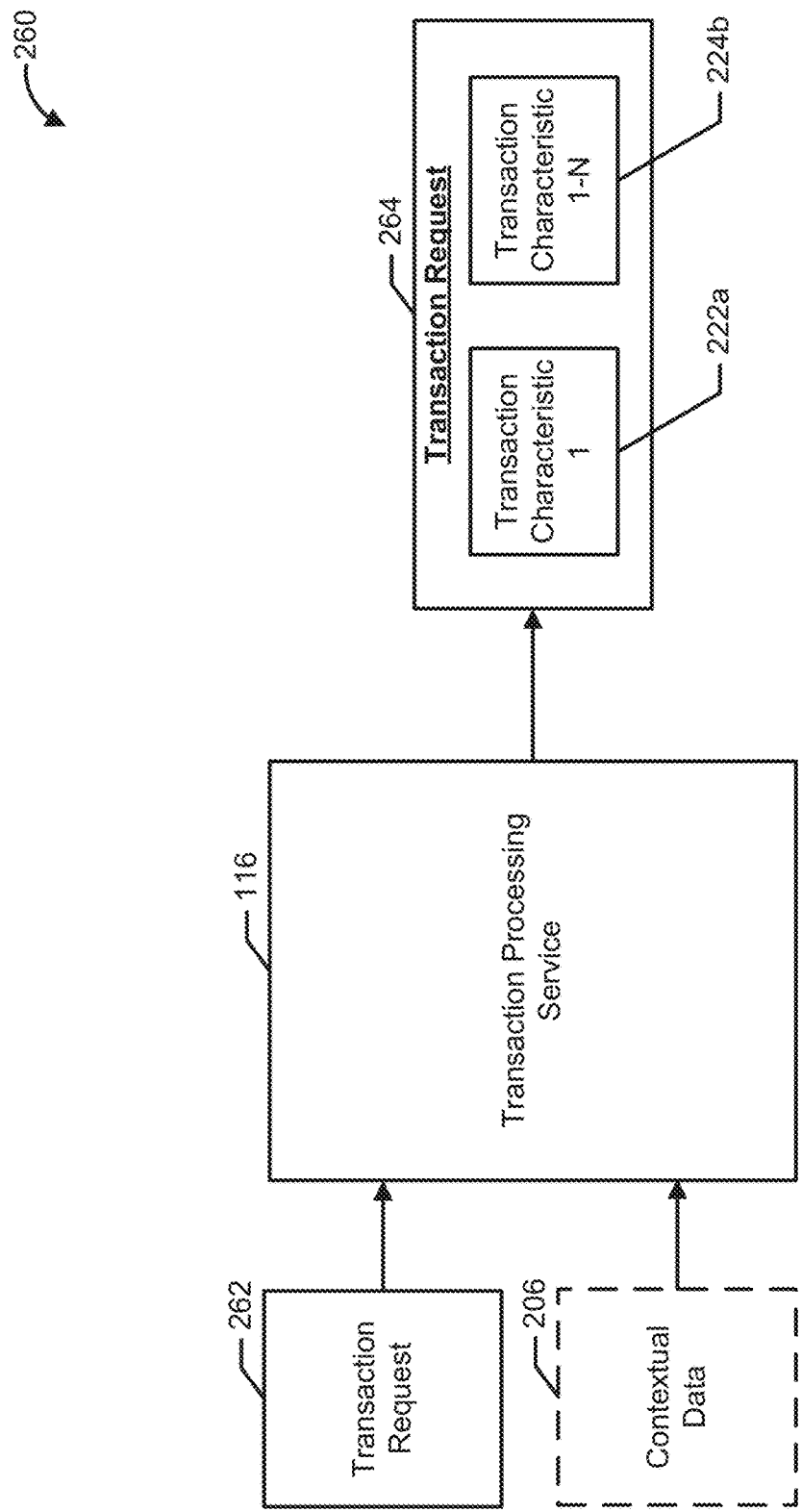
FIG. 2C is an embodiment of a block diagram of determining transaction characteristics of a transaction request by a transaction classifier service.

FIG. 2C illustrates an embodiment of a component block diagram 260 of the transaction processing service 116 determining the transaction characteristics of a transaction request 262 for use with the decision tree representation of the transaction processing model 214 (for example, as described with reference to FIG. 2B). Specifically, as illustrated, the transaction processing service 116 may receive as input the transaction request 262, for example, from a user computing device (for example, one of the user computing devices 102 described with reference to FIG. 1). The transaction processing service 116 may analyze the transaction request 262 in order to determine one or more characteristics of the transaction request 262. As described, these characteristics may include or describe various aspects of the transaction request, including but not limited to whether the transaction request corresponds to a recurring or non-recurring transaction, the time of day or the date at which the transaction request was received, an amount of currency reflected in the transaction request, and/or the like.

In the example illustrated in FIG. 2C, the transaction processing service 116 may determine that the transaction request 262 is associated with a first transaction characteristic 266*a* and a second transaction characteristics 266*b*. The transaction processing service 116 may then generate, as output, a representation 264 of the transaction request 262 that indicates the transaction characteristics 222*a* and 224*b* of the transaction request 262. By way of an example, the transaction processing service 116 may generate the representation 264 of the transaction request 262 as a one-dimensional feature vector array, where each entry in the array corresponds to a value for characteristic. In some optional embodiments, the transaction processing service 116 may utilize contextual data 206 (for example, as described with reference to FIG. 2A) when determining the characteristics of the transaction request 264. In such embodiments, the transaction processing service 116 may incorporate the contextual data 206 in the representation 262 of the transaction request 262.

Figure 2D:
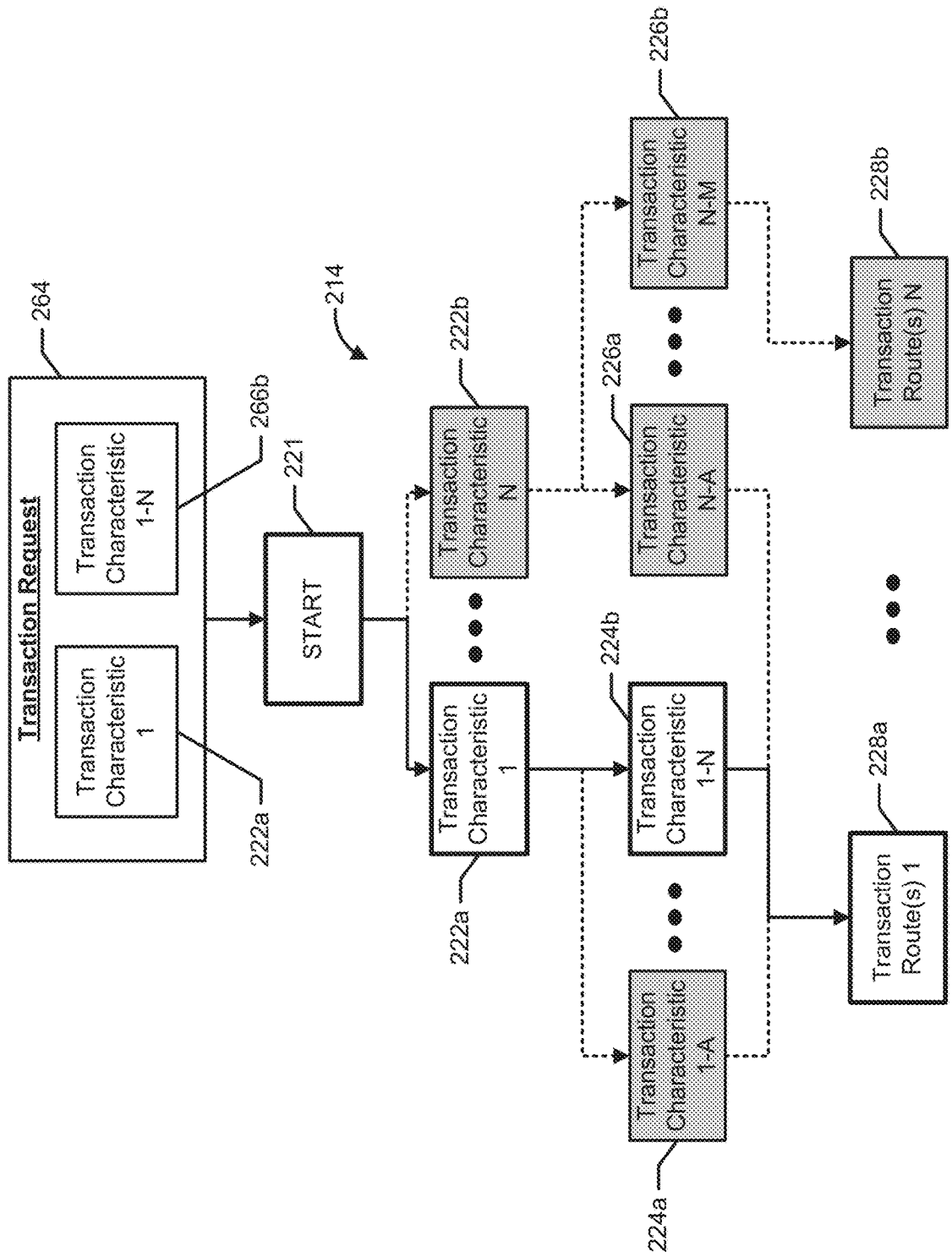
FIG. 2D is an embodiment of a block diagram illustrating applying a transaction processing model to a transaction request, according to some embodiments.

V. Example Application of Transaction Request Characteristics to Transaction Processing Model FIG. 2D illustrates an embodiment application of the transaction request representation 264 (for example, as described with reference to FIG. 2C) to the transaction processing model 214. In the example illustrated in FIG. 2D, the transaction processing service 116 may apply the transaction request representation 264 to the transaction processing model 214 by utilizing the determined transaction characteristics of the transaction request representation 214 to traverse the decision tree. Specifically, the transaction processing service 116 may move from the root 221 of the decision tree to the transaction characteristic 222*a* (as shown in bolded blocks) because the transaction request representation 264 may include or be associated with the transaction characteristic 222*a*. Similarly, the transaction processing service 116 may continue traversing the decision tree by moving to the transaction characteristic 224*b* because the transaction request representation 264 may include the transaction characteristic 224*b*. The transaction processing service 116 may conclude traversal of the decision tree by determining that the output of applying the transaction request representation 264 to the transaction processing model 214 is the first set of transaction routes 228*a*. As described, the first set of transaction routes 228*a* may include one or more transaction routes, and the transaction processing service 116 may utilize the one or more transaction routes in one or more attempts to convert the transaction request 262.

VI. Transaction Processing Model Generation Process

Figure 3:
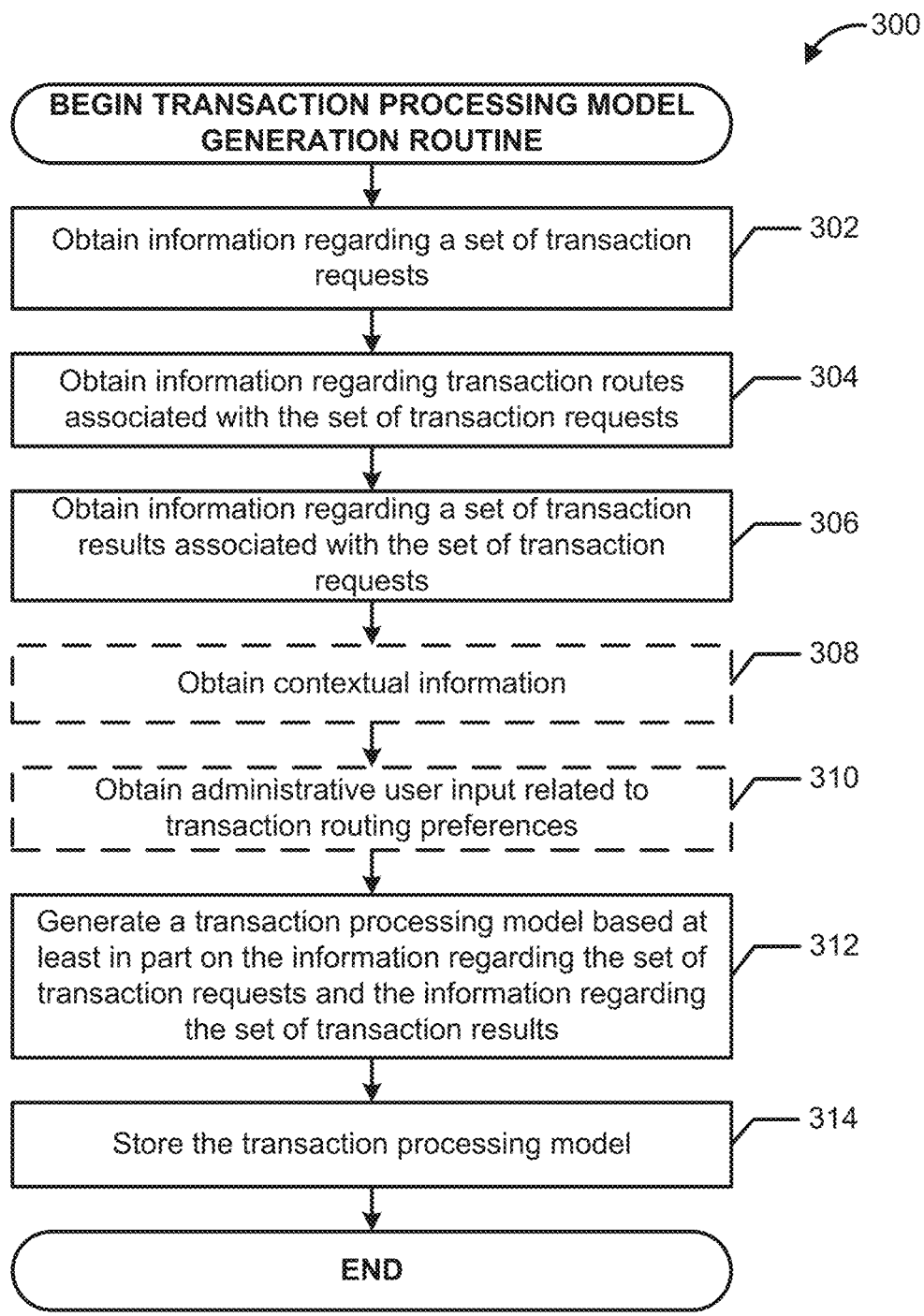
FIG. 3 is an embodiment of a process flow diagram illustrating a computer-implemented method for processing a transaction request using a transaction processing model.

FIG. 3 illustrates an embodiment of a flowchart for a process 300 for generating a transaction processing model. The process 300 can be implemented by any system that can load and/or initiate a system for generating a transaction processing model. For example, the process 300, in whole or in part, can be implemented by the transaction model generation service 110, the transaction feedback service 114, the transaction processing service 116, the processing information data store 118, the transaction processing system 104, or other computing system. Although any number of systems, in whole or in part, can implement the process 300, to simplify discussion, the process 300 will be described with respect to particular systems. Further, although embodiments of the process 300 may be performed with respect to variations of systems comprising various financial environments, to simplify discussion, the process 300 will be described with respect to the transaction model generation service 110 (for example, as described with reference to FIG. 1).

At block 302, the transaction processing model generation service 110 may obtain information regarding a set of transaction requests. In some embodiments, this information may indicate various characteristics of one or more transaction requests. The characteristics of a transaction request may include or may reflect the payment gateway of the underlying transaction, the payment provider, the type of currency associated with the transaction request, the time of day at which the transaction request was created, the date on which the transaction request was created, whether the transaction request is related to a payment with a credit card or a debit card, whether the transaction request is related to a recurring transaction or a non-recurring transaction, whether the transaction request is related to a pre-authorization transaction or an authorization transaction, and/or the like.

The transaction processing model generation service 110 may obtain information regarding transaction routes associated with the set of transaction requests, at block 304. Specifically, the information obtained at block 304 may reflect one or more transaction routes that were utilized in an attempt to process each of the transaction routes in the set of transaction requests. By way of an example, the information regarding transaction routes may indicate the one or more financial systems to which the set of transaction requests were provided for processing or other information that may reflect the processing path or steps that were taken in attempts to convert those transaction requests.

At block 306, the transaction processing model generation service 110 may also obtain information regarding a set of transaction results associated with the set of transaction requests. The information obtained in block 306 may indicate whether use of the one or more transaction routes (for example, as described in the information obtained at block 304) led to successful conversion of the set of transaction requests. In some embodiments, the information obtained at block 306 may include information regarding each attempt to convert the one or more transaction requests in the set. As such, this information may indicate that a first attempt to convert a transaction request using a first transaction route failed but that a second attempt to convert the transaction request using a second transaction route succeeded.

In some embodiments, the transaction processing model generation service 110 may obtain contextual information, in optional block 308. As described (for example, with reference to FIG. 2A), the contextual information may include information regarding the performance or availability of financial systems, networks, or other external entities that may have impacted the success or failure of attempts to convert one or more transactions in the set of transactions. As such, the contextual information 308 may indicate that a failed attempt to convert a transaction request in the set using a particular transaction route may have been caused by an external factor, such as an unavailability of the financial system associated with the transaction route (for example, due to routine maintenance).

In optional block 310, the transaction processing model generation service 110 may optionally obtain administrative user input related to transaction routing preferences. Specifically, such user input may indicate that one or more transaction routes should be emphasized or deemphasized. For example, the user input may express a preference for transaction routes in which a transaction request is attempted as a credit card transaction instead of transaction routes in which the transaction request is attempted as a debit card transaction.

At block 312, the transaction processing model generation service 110 may generate a transaction processing model based at least in part on the information regarding the set of transaction requests obtained at block 302, the information regarding transaction routes associated with the set of transaction requests obtained at block 304, and the information regarding the set of transaction results obtained in block 306. In some embodiments, the transaction processing model may organize (or obtain) the information obtained at blocks 302-306 as a set of transaction data. The set of transaction data may indicate transaction routes that were or were not used successfully to convert transaction requests and what the characteristics of those transaction requests were. As such, the transaction processing model generation service 110 may determine the likelihood that combinations of transaction requests and transaction routes will results in successful conversion attempts. For example, based on the set of transaction data, the transaction processing model generation service 110 may determine that using a transaction route in an attempt to convert a transaction request having a set of characteristics has an 80% likelihood of succeeding.

Further, in some embodiments, the transaction processing model generation service 110 may identify a set of transaction routes that may have a highest likelihood of successfully converting a transaction request having a certain set of characteristics. In such embodiments, the set of transaction routes may be ordered such that a first attempt to convert the transaction request is associated with the first transaction route in the set, a second attempt to convert the transaction request may be associated with the second transaction route in the set, and so on.

In optional some embodiments, the transaction processing model generation service 110 may utilize the contextual information obtained at block 308 and/or the administrative input received at block 310 to generate the transaction processing model, at block 312. In such embodiments, the transaction processing model generation service 110 may utilize the contextual information to adjust the likelihoods that transaction routes will result in a successful conversion of a transaction request. For example, the transaction processing model generation service 110 may lower the likelihood that one or more transaction routes will lead to successful conversion of a transaction request because a financial system associated without those one or more routes has had a data breach and has begun rejecting an increasing number of attempts to convert transaction requests.

In some embodiments of the operations performed at block 312, the transaction processing service 116 may generate a general or base transaction processing model that may include various decision trees, paths, or the like that may be suitable for processing various types of transaction requests. However, in some embodiments, the transaction processing service 116 may generate a specific transaction processing models for each type of transaction request. In such embodiments, the specific transaction processing models may be significantly smaller than a general or base transaction processing model. As such, utilizing these specific transaction processing models to identify a set of transaction routes to utilize with a type of transaction request may be accomplished faster and with fewer processing and power resources than utilizing a general or base transaction processing model.

At block 314, the transaction processing model generation service 110 may store the transaction processing model. Following storage of the transaction processing model in block 314, the transaction processing model generation service 110 may cease performing the operations of the routine 300.

VII. Transaction Processing Model Utilization Process

Figure 4:
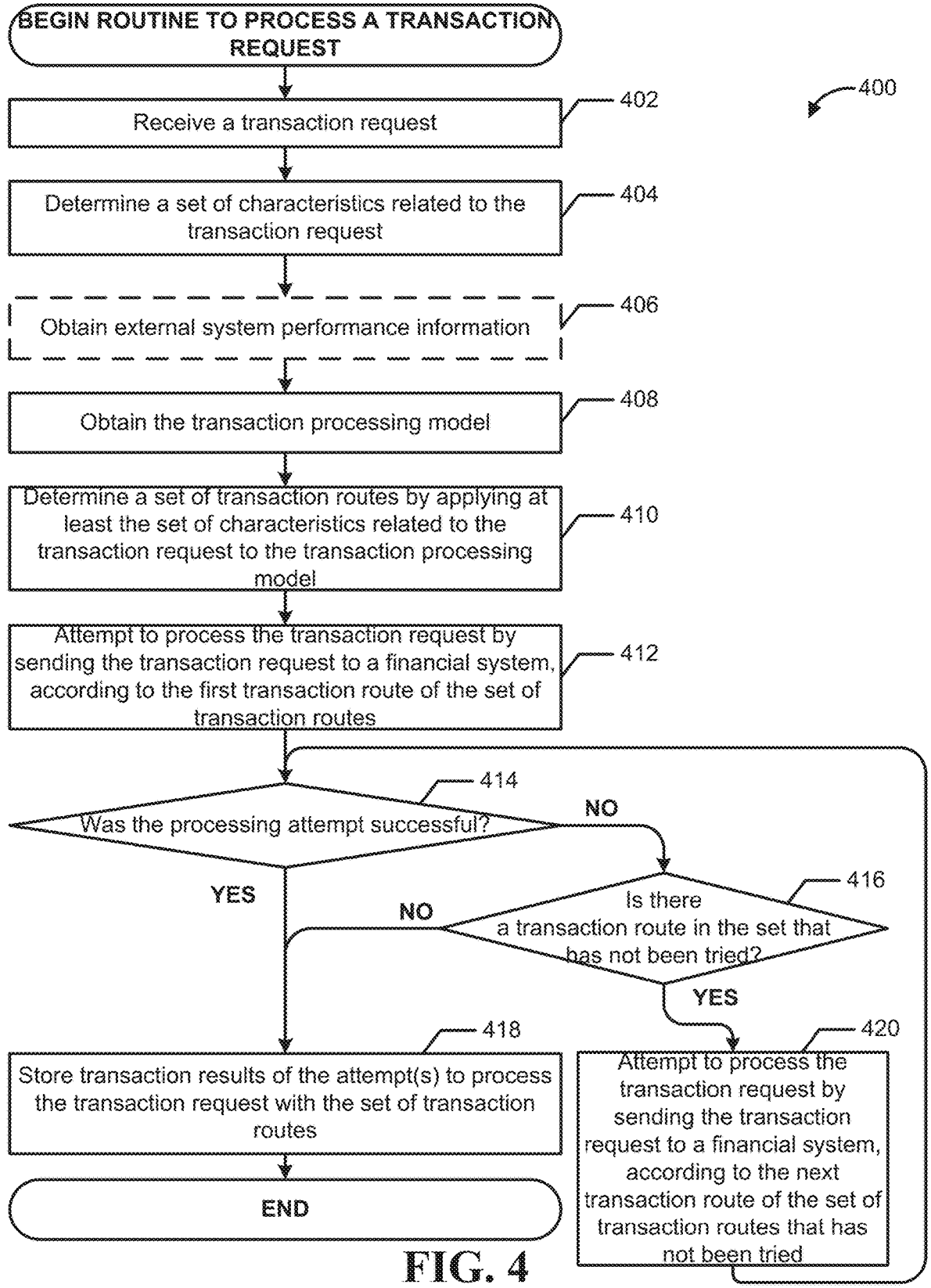
FIG. 4 is an embodiment of a process flow diagram illustrating a computer-implemented method for processing a transaction request using a transaction processing model.

FIG. 4 illustrates an embodiment of a flowchart for a process 400 for processing a transaction request using a transaction processing model. The process 400 can be implemented by any system that can load and/or initiate a system for using a transaction processing model. For example, the process 400, in whole or in part, can be implemented by the transaction model generation service 110, the transaction feedback service 114, the transaction processing service 116, the processing information data store 118, the transaction processing system 104, or other computing system. Although any number of systems, in whole or in part, can implement the process 400, to simplify discussion, the process 400 will be described with respect to particular systems. Further, although embodiments of the process 400 may be performed with respect to variations of systems comprising various financial environments, to simplify discussion, the process 400 will be described with respect to the transaction processing service 116.

At block 402, the transaction processing service 116 may receive a transaction request, for example, from a user computing device. The transaction processing service 116 may, in block 404, determine a set of characteristics related to the transaction request. In some embodiments, the set of characteristics may describe various aspects of the transaction request or the underlying transaction, such as the type of payment instrument, an issuer associated with the payment type (for example, a credit card), an acquirer, payment processor, or the like. In some embodiments of the operations performed at block 402, the transaction processing service 116 may generate a feature vector or another data structure that may describe the set of characteristics or that may be suitable for application to a transaction processing model (for example, as described with reference to FIGS. 2C and 2D).

In some optional embodiments, the transaction processing service 116 may obtain external system performance information in optional block 406. In some embodiments, the external system performance information may indicate various aspects or issues that may affect the conversion of the transaction request received at block 402. For example, the external system performance information may indicate that one or more financial systems are currently unavailable due to a network outage. In such embodiments, the transaction processing service 116 may modify one or more of the characteristics in the set of characteristics or may add one or more additional characteristics to the set of characteristics to reflect the external system performance information. In some embodiments, the information related to the unavailability of one or more financial systems may include an update to prior information related to the unavailability of the one or more financial systems. For example, the transaction processing model may reflect the scheduled unavailability of a financial system during a first period of time, and the external system performance information received in block 406 may indicate that the scheduled unavailability of the financial system has changed to a second period of time.

At block 408, the transaction processing service 116 may access a transaction processing model. In some embodiments, the transaction processing service 116 may access a base or general model that may be generally suitable for use with transaction requests. Alternatively, the transaction processing service 116 may access a transaction processing model that is specifically associated with type of transaction request received at block 402 (for example, as described with reference to FIG. 3).

At block 410, the transaction processing service 116 may determine a set of transaction routes by applying at least the set of characteristics related to the transaction request to the transaction processing model. In some embodiments, the transaction processing service 116 may apply the set of characteristics to the model by traversing a decision tree representation of the transaction processing model. Specifically (for example, as described with reference to FIG. 2D), the transaction processing service 116 may utilize each characteristics in the set to determine the path through the decision tree. In such embodiments, the transaction processing service 116 may determine the set of transaction routes by reaching the end of the decision tree.

In some embodiments (not shown), the transaction processing service 116 may determine that the set of transaction routes is associated with a likelihood of successfully converting the transaction request that is below a threshold likelihood. In such embodiments, the transaction processing service 116 may generate a notification to a user computing device associated with the transaction indicating that there is a low likelihood of successfully converting the transaction request. Further, the notification may prompt the user of the user computing device for authorization to continue with the attempts to convert the transaction request. In some additional (or alternative) embodiments, the transaction processing service 116 may determine one or more alternative characteristics of the transaction request and may utilize those alternative characteristics to identify an alternative set of transaction routes that may be associated with a higher likelihood of successfully converting the transaction request. By way of an example, the transaction processing service 116 may determine that the transaction request may have a low likelihood of being successfully converted at the time the transaction request was received, but the transaction may have a much higher likelihood of being successfully converted at a later time. In another example, the transaction processing service 116 may determine that modifying the transaction request to use a different payment instrument may improve the likelihood of successful conversion. As such, the transaction processing service 116 may notify the user of these potential alternative transaction request characteristics and may prompt the user for authorization or information to attempt to modify the transaction request to include these alternative characteristics.

At block 412, the transaction processing service 116 may attempt to process the transaction request by sending the transaction request to a financial system, according to the first transaction route of the set of transaction routes. The first transaction route may be associated with the highest likelihood of successfully converting the transaction request, the second transaction route may be associated with the next highest likelihood, and so forth. In some embodiments, the set of transaction routes may be organized based on expected attempts to convert the transaction request. As such, the first transaction route may be associated with the highest likelihood of converting the transaction request on a first attempt, a second transaction route in the set may be associated with the highest likelihood of converting the transaction request on a second attempt, and so on.

The transaction processing service 116 may determine, in decision block 414, whether the processing attempt initiated in block 412 was successful. In some embodiments, the transaction processing service 116 may receive an indication from the financial system to which the transaction processing service 116 sent the transaction request whether the transaction request was successful or failed.

In response to determining that the processing attempt was not successful, the process 400 proceeds to decision block 416. At decision block 416, the transaction processing service 116 may determine whether there is a transaction route in the set of transaction routes that has not been tried. In response to determining that there is a transaction route in the set of transaction routes that has not been tried, the process 400 proceeds to block 420. At block 420, the transaction processing service 116 may attempt to process the transaction request by sending the transaction request to a financial system, according to the next transaction route of the set of transaction routes that has not been tried. In such embodiments, the transaction processing service 116 may perform the above operations in a loop by determining whether the processing attempt initiated in block 420 was successful, in decision block 414. As such, the transaction processing service 116 may continue attempting to process the transaction request using one or more transaction routes of the set of transaction routes until a processing attempt is successful or until each transaction route in the set has been tried.

As such, in response to determining that a processing attempt is successful or in response to determining that each transaction route in the set of transaction routes has been tried without success, the process 400 proceeds to block 418. At block 418, the transaction processing service 116 may store the transaction results of the one or more attempts to process the transaction request. In some embodiments, the transaction processing service 116 may provide information regarding the transaction results, the set of transaction routes, and the set of characteristics of the transaction request to the transaction processing model generation service 110. In response, the transaction processing model generation service 110 may update the transaction processing model, as further described (for example, with reference to FIG. 5).

After storing the transaction results in block 418, the transaction processing service 116 may cease performing the operations of the routine 400.

VIII. Transaction Processing Model Feedback Process

Figure 5:
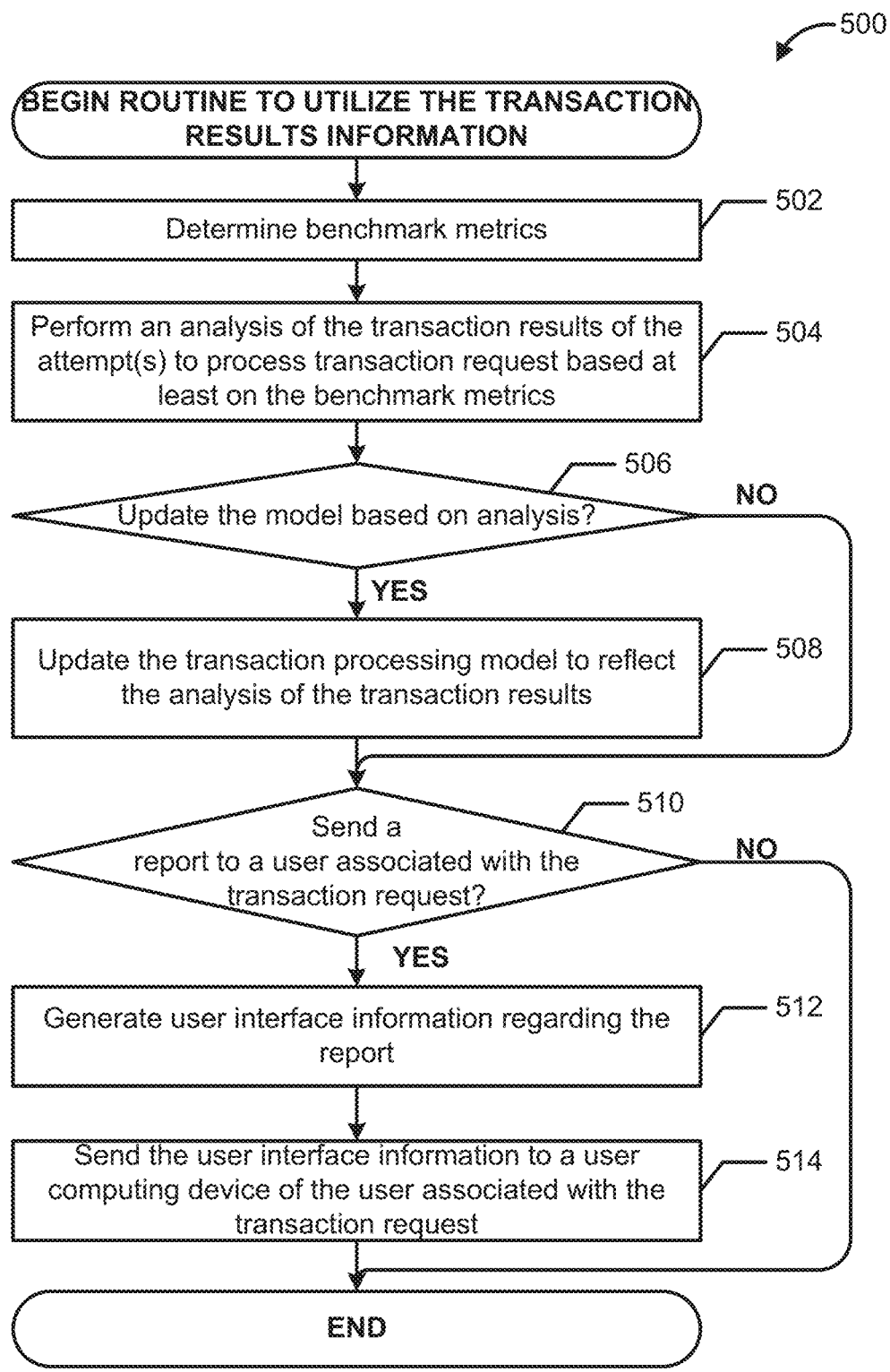
FIG. 5 is an embodiment of a process flow diagram illustrating a computer-implemented method for utilizing the results of a transaction processed with a transaction processing model.

FIG. 5 illustrates an embodiment of a flowchart for a process 500 for utilizing transaction results information stored at block 418 of the process 400. The process 500 can be implemented by any system that can load and/or initiate a system for using feedback results. For example, the process 500, in whole or in part, can be implemented by the transaction model generation service 110, the transaction feedback service 114, the transaction processing service 116, the processing information data store 118, the transaction processing system 104, or other computing system. Although any number of systems, in whole or in part, can implement the process 500, to simplify discussion, the process 500 will be described with respect to particular systems. Further, although embodiments of the process 500 may be performed with respect to variations of systems comprising various financial environments, to simplify discussion, the process 500 will be described with respect to the transaction feedback service 114.

At block 502, the transaction feedback service 114 may determine benchmark metrics. The transaction feedback service 114 may, in block 504, perform an analysis of the transaction results of one or more attempts to process the transaction request based at least on the benchmark metrics determined in block 502.

In some embodiments, the benchmark metrics may represent an expected, desired, or required conversion rate for the set of transaction routes used in one or more attempts to convert the transaction request (for example, as described with reference to FIG. 4). For example, the transaction feedback service 114 may receive user input indicating that a desired conversion rate for the set of transaction routes is 80%. In such embodiments, the transaction feedback service 114 may monitor the use of the set of transaction routes (for example, for a period of time) and may determine that the use of this set of transaction routes is or is not meeting or exceeding the desired conversion rate.

In some embodiments, the benchmark metrics may represent a comparison of the performance of the set of transaction routes with another set of transaction routes. Specifically, the transaction feedback service 114 may perform comparative testing of two sets of transaction routes (for example, AB testing) to determine whether, over time, one set of transaction routes performs better than the other set. For example, the transaction processing service 116 may alternatively utilize either a first set of transaction routes or a second set of transaction routes in attempts to convert a type of transaction request. The transaction processing service 116 may provide the transaction results of utilizing each of these sets, and the transaction feedback service 114 may compare the results to determine if one of the sets is associated with an overall higher likelihood of successfully converting that type of transaction request.

In decision block 506, the transaction feedback service 114 may determine whether to update the model based on the analysis performed in block 504. In response to determining to update the model based on the analysis performed in block 506, the process 500 may proceed to block 508. At block 508, the transaction feedback service 114 may update the transaction processing model to reflect the analysis of the transaction results performed in block 504. Specifically, in some embodiments, the transaction feedback service 114 may modify the transaction processing model to reflect the actual performance of the set of transaction routes. In such embodiments, the transaction feedback service 114 may emphasize or deemphasize the set of transaction routes based on the actual performance. For example, the transaction feedback service 114 may modify paths of the decision tree to lead towards or away from the set of transaction routes. In some embodiments in which the transaction feedback service 114 performs comparative testing, the transaction feedback service 114 may update the model to emphasize one set of transaction routes that performs better than another set of transaction routes, and optionally, the transaction feedback service 114 may deemphasize the other set of transaction routes in the transaction processing model.

In some embodiments (for example, as described above), the transaction feedback service 114 may modify one or more paths of a decision tree represented in the transaction processing model. For example, in the event that the analysis indicates that the set of transaction routes is performing worse than expected, the transaction feedback service 114 (or the transaction processing model generation service 110 may decrease the likelihoods of successfully converting a transaction route (or some other score) associated with the transaction routes in the set. As such, the set of transaction routes may not be selected for use in attempting to convert a similar transaction request in the future.

In some additional (or alternative) embodiments, the transaction feedback service 114 may utilize the benchmark metrics to determine that one or more of the transaction routes in the set of transaction routes is performing poorly. For example, the transaction feedback service 114 may determine that the first transaction route in the set routinely fails to convert the transaction request, but the second transaction route in the set routine succeeds to convert the transaction request. As such, the transaction feedback service 114 may update the model by removing (or adding) one or more transaction routes to a set of transaction routes used to process the transaction request.

In response to determining not to update the model based on the analysis performed in block 504 or in response to updating the transaction processing model in block 508, the process 500 may proceed to decision block 510. At decision block 510, the transaction feedback service 114 may determine whether to send a report to a user associated with the transaction request. Specifically, the transaction feedback service 114 may generate a report or other information that may include information regarding whether the one or more attempts to convert the transaction request succeeded or failed. This report may indicate information about each of the one or more attempts and/or may include information describing the characteristics of the transaction request and contextual information (for example, known unavailability of a financial system).

In response to determining to send a report to a user associated with the transaction request, the process 500 may proceed to block 512. At block 512, the transaction feedback service 114 may generate user interface information regarding the report. At block 514, the transaction feedback service 114 may send the user interface information to a user computing device of the user associated with the transaction request.

In response to determining not to send a report to the user associated with the transaction request or in response to sending the user interface information to the user computing device of the user associated with the transaction request in block 514, the transaction feedback service 114 may cease performing the operations of the routine 500.

IX. Overview of Transaction Processing System

Figure 6:
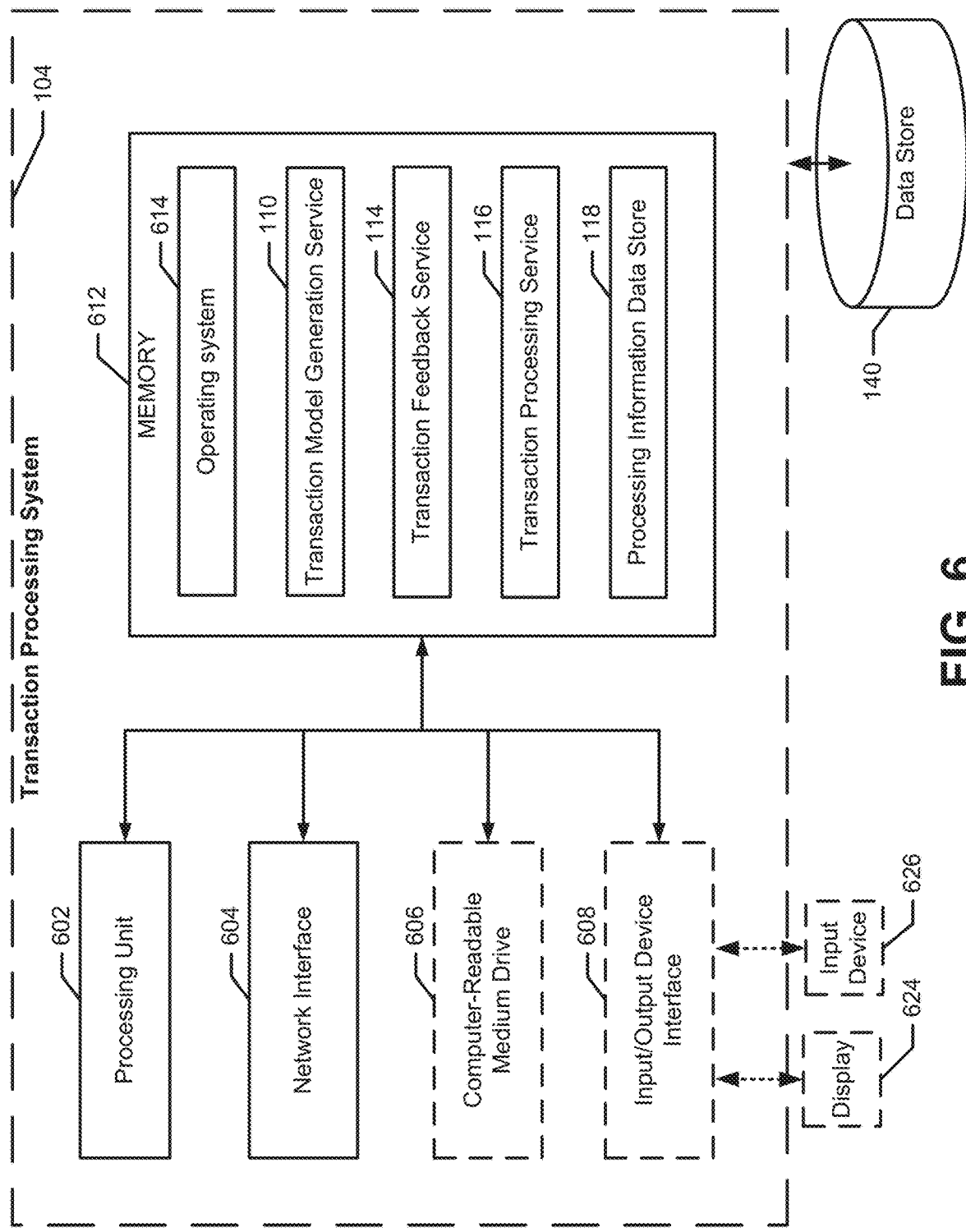
FIG. 6 illustrates an embodiment of a component diagram of an example transaction processing system suitable for use with some embodiments.

FIG. 6 further depicts a general architecture of the transaction processing system 104, which includes an arrangement of computer hardware and software components that may be used to implement aspects of the present disclosure. The transaction processing system 104 may include many more (or fewer) elements than those shown in FIG. 6. It is not necessary, however, that all of these generally conventional elements be shown in order to provide an enabling disclosure.

As illustrated, the transaction processing system 104 includes a processing unit 602, a network interface 604, a computer readable medium drive 606, and an input/output device interface 608, all of which may communicate with one another by way of a communication bus. The network interface 104 may provide connectivity to one or more networks (for example, the networks 124 and 126 as described with reference to FIG. 1) or computing systems and, as a result, may enable the transaction processing system 104 to receive and send information and instructions from and to other computing systems or services. For example, the transaction processing system 104 may receive transaction requests from one or more of user computing devices (for example, the user computing devices 102 described with reference to FIG. 1) via the network interface 604. The processing unit 604 may also communicate with one or more computing devices at financial institutions via the network interface 604, such as by providing the transaction requests from the one or more user computing devices to the one or more computing devices at the financial institutes according to one or more transaction routes, as described.

The processing unit 604 may also communicate to and from memory 612. The memory 612 may contain computer program instructions (grouped as modules or components in some embodiments) that the processing unit 604 may execute in order to implement one or more embodiments. The memory 612 generally includes RAM, ROM, and/or other persistent, auxiliary, or non-transitory computer-readable media. The memory 612 may store an operating system 614 that provides computer program instructions for use by the processing unit 604 in the general administration and operation of the transaction processing system 104. The memory 612 may include computer program instructions and other information for implementing aspects of the present disclosure. For example, in some embodiments, the memory 612 may include the transaction processing model generation service 110, the transaction feedback service 114, and the transaction processing service 116, each of which may be executed by the processing unit 604 to perform various operations, such as those operations described with reference to FIGS. 1-5. The memory may also include the processing information data store 118 (for example, as described with reference to FIG. 1).

In some embodiments, one or more of the transaction processing model generation service 110, the transaction feedback service 114, and the transaction processing service 116 may be implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

While the transaction processing model generation service 110, the transaction feedback service 114, and the transaction processing service 116 are illustrated as a distinct modules in the memory 612, in some embodiments, one or more of the transaction processing model generation service 110, the transaction feedback service 114, and the transaction processing service 116 may be incorporated as a module in the operating system 614 or another application or module, and as such, a separate module for one or more of the transaction processing model generation service 110, the transaction feedback service 114, and the transaction processing service 116 may not be required to implement some embodiments.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
  a server comprising at least one processor configured with computer-executable instructions to perform operations comprising:
  receiving from a first computing device, by the at least one processor, a transaction request for a transaction between the first computing device associated with a user and a computing device associated with a vendor;
  determining, by the at least one processor, a first set of transaction request characteristics related to the transaction request, wherein the transaction request characteristics comprise one or more of: a payment type, an intended acquirer, payment processor or gateway, a type of payment instrument, an issuer of the payment instrument, a location in which the payment instrument is issued, whether the payment instrument is a pre-paid card, whether the transaction request is associated with an authorization transaction or a preauthorization transaction, a type of currency associated with the transaction request, an amount of currency associated with the transaction request, a time of day at which the transaction request is received, or a date on which the transaction request is made or received;
  accessing, by the at least one processor, a transaction processing model comprising information regarding a plurality of sets of transaction routes available for use in completing transaction requests, wherein each set of transaction routes identifies a network-based communication route including at least one remote financial computing system that is communicated with in order to complete the transaction request;
  determining, by the at least one processor, a first set of transaction routes using the transaction processing model based at least in part on the first set of transaction request characteristics, wherein the first set of transaction routes is associated with a first likelihood value, the first likelihood value is indicative of the likelihood that the transaction request is successfully completed using the first set of transaction routes, wherein a transaction route is the route in which the server provides the transaction request to a financial system for conversion of the transaction request for the vendor;

determining, by the at least one processor, whether the first likelihood value of the first set of transaction routes is below a conversion threshold;

in response to a determination that the first likelihood value is below the conversion threshold,
- determining, by the at least one processor, one or more modifications to the first set of transaction request characteristics resulting in a second set of transaction request characteristics; and
- determining, by the at least one processor, a second set of transaction routes using the transaction processing model based at least in part on the second set of transaction request characteristics, wherein the second set of transaction routes has a second likelihood value that indicates the likelihood of successfully completing the transaction request is increased relative to the first likelihood value;

generating, by the at least one processor, a user interface prompt identifying a recommendation for a proposed modification of the first set of transaction request characteristics to the second set of transaction request characteristics;

receiving from the first computing device, by the at least one processor, input changing the first set of transaction request characteristics of the transaction request to the second set of transaction request characteristics in response to the recommendation;

sending, by the at least one processor, the transaction request to a second computing device according to a transaction route of the second set of transaction routes;

receiving from the second computing device, by the at least one processor, transaction results regarding the transaction request;

performing, by the at least one processor, an analysis of the transaction results based, at least in part, on benchmark metrics;

generating, by the at least one processor, user interface instructions for display of the transaction results and the analysis of the transaction results using the benchmark metrics; and sending, by the at least one processor, the user interface instructions to the first computing device for presentation.

2. The system of claim 1, wherein determining the first set of transaction routes from the transaction processing model and the first set of transaction request characteristics related to the transaction request comprises determining that, from among the plurality of sets of transaction routes, the set of transaction routes is associated with a highest likelihood of successfully completing transaction requests having the first set of transaction request characteristics related to the transaction request.

3. The system of claim 1, wherein determining the first set of transaction routes from the transaction processing model and the first set of transaction request characteristics related to the transaction request comprises determining a result of applying a decision tree of the transaction processing model using at least the first set of transaction request characteristics, wherein the result of applying the decision tree indicates the set of transaction routes.

4. The system of claim 3, wherein the computer-executable instructions further configure the at least one processor of the server to perform operations comprising:
- accessing external system performance information of the second computing device; and
- determining the result of the decision tree of the transaction processing model further comprises using the external system performance information of the second computing device.

5. The system of claim 1, wherein the computer-executable instructions further configure the at least one processor of the server to perform operations comprising:
- accessing information regarding a set of transaction requests;
- accessing information regarding a set of transaction results corresponding to the set of transaction requests; and
- accessing the transaction processing model further comprises generating the transaction processing model at least in part from the information regarding the set of transaction requests, and the information regarding the set of transaction results corresponding to the set of transaction requests.

6. The system of claim 5, wherein the computer-executable instructions further configure the at least one processor of the server to perform operations comprising:
- accessing system performance information of the second computing device;
- accessing information regarding available transaction routes; and
- accessing the transaction processing model further comprises generating the transaction processing model at least in part from the system performance information of the second computing device and the information regarding available transaction routes.

7. The system of claim 5, wherein the computer-executable instructions further configure the at least one processor of the server to perform operations comprising:
- accessing user input from a user of the server; and
- accessing the transaction processing model further comprises generating the transaction processing model at least in part from the user input from the user of the server.

8. The system of claim 1, wherein the computer-executable instructions further configure the at least one processor of the server to perform operations comprising:
- determining that the transaction results indicate that the transaction request was rejected; and
- sending the transaction request to one of the second computing device or a third computing device according to another transaction route of the set of transaction routes.

9. The system of claim 8, wherein the transaction processing model is further configured to indicate that, from among the first set of transaction routes, a first transaction route is associated with a highest likelihood of successfully completing transaction request, and that a second transaction route is associated with a next highest likelihood of successfully completing transaction request.

10. The system of claim 8, wherein the transaction processing model is further configured to indicate that, from among the first set of transaction routes, a first transaction route is associated with a highest likelihood of successfully completing transaction request on a first attempt and that a second transaction route is associated with a highest likelihood of successfully completing transaction request on a second attempt.

11. A computer-implemented method comprising:
by a server comprising at least one processor configured with computer-executable instructions,
receiving from a first computing device, by the at least one processor, a transaction request for a transaction between the first computing device associated with a user and a computing device associated with a vendor;
determining, by the at least one processor, a first set of transaction routes using a transaction processing model based at least in part on a first set of transaction request characteristics related to the transaction request, wherein the first set of transaction routes is associated with a first likelihood value indicating a likelihood of successfully completing the transaction request using the first set of transaction routes, wherein the first set of transaction routes identifies a network-based communication route including at least one remote financial computing system that is communicated with in order to complete the transaction request, wherein a transaction route is the route in which the server provides the transaction request to a financial system for conversion of the transaction request for the vendor;
determining, by the at least one processor, whether the first likelihood value of the first set of transaction routes is below a conversion threshold;
in response to a determination that the first likelihood value is below the conversion threshold,
    determining, by the at least one processor, one or more modifications to the first set of transaction request characteristics resulting in a second set of transaction request characteristics, and
    determining, by the at least one processor, a second set of transaction routes using the transaction processing model based at least in part on the second set of transaction request characteristics, wherein the second set of transaction routes has a second likelihood value that indicates the likelihood of successfully completing the transaction request is increased relative to the first likelihood value;
generating, by the at least one processor, a user interface prompt identifying a recommendation for a proposed modification of the first set of transaction request characteristics to the second set of transaction request characteristics;
receiving from the first computing device, by the at least one processor, input changing the first set of transaction request characteristics of the transaction request to the second set of transaction request characteristics in response to the recommendation;
sending, by the at least one processor, the transaction request to a second computing device according to a transaction route of the second set of transaction routes;
receiving from the second computing device, by the at least one processor, transaction results regarding the transaction request;
performing, by the at least one processor, an analysis of the transaction results based, at least in part, on benchmark metrics associated with a set of transaction records;
generating, by the at least one processor, user interface instructions for display of the transaction results and the analysis of the transaction results using the benchmark metrics; and
sending, by the at least one processor, the user interface instructions to the first computing device for presentation.

12. The computer-implemented method of claim 11, further comprising modifying the transaction processing model based at least in part on the analysis of the transaction results.

13. The computer-implemented method of claim 11, wherein determining the first set of transaction routes from the transaction processing model and the first set of transaction request characteristics comprises determining a result of applying a decision tree of the transaction processing model using at least the first set of transaction request characteristics, wherein the result of applying the decision tree indicates the first set of transaction routes.

14. The computer-implemented method of claim 13, further comprising accessing external system performance information of the second computing device,
    wherein determining the result of applying the decision tree of the transaction processing model further comprises using the external system performance information of the second computing device.

15. The computer-implemented method of claim 11, further comprising:
    accessing information regarding a set of transaction requests;
    accessing information regarding a set of transaction results corresponding to the set of transaction requests; and
    wherein accessing the transaction processing model comprises generating the transaction processing model at least in part from the information regarding the set of transaction requests, and the information regarding the set of transaction results corresponding to the set of transaction requests.

16. The computer-implemented method of claim 15, further comprising:
    accessing system performance information of the second computing device;
    accessing information regarding available transaction routes; and
    wherein accessing the transaction processing model further comprises generating the transaction processing model at least in part from the system performance information of the second computing device and the information regarding available transaction routes.

17. A non-transitory, computer-readable medium having stored thereon computer-executable software instructions configured to cause at least one processor of a server computing device to perform operations comprising:
    receiving from a first computing device, by the at least one processor, a transaction request for a transaction between the first computing device associated with a user and a computing device associated with a vendor;
    determining, by the at least one processor, a first set of transaction routes using a transaction processing model based at least in part on a first set of transaction request characteristics related to the transaction request, wherein the first set of transaction routes is associated with a first likelihood value indicating a likelihood of successfully completing the transaction request using the first set of transaction routes, wherein the first set of transaction routes identifies a network-based communication route including at least one remote financial computing system that is communicated with in order to complete the transaction request, wherein a transaction route is the route in which the server computing device provides the transaction request to a financial system for conversion of the transaction request for the vendor;

determining, by the at least one processor, whether the first likelihood value of the first set of transaction routes is below a conversion threshold;
in response to a determination that the first likelihood value is below the conversion threshold,
   determining, by the at least one processor, one or more modifications to the first set of transaction request characteristics resulting in a second set of transaction request characteristics, and
   determining, by the at least one processor, a second set of transaction routes using the transaction processing model based at least in part on the second set of transaction request characteristics, wherein the second set of transaction routes has a second likelihood value that indicates the likelihood of successfully completing the transaction request is increased relative to the first likelihood value;
generating, by the at least one processor, a user interface prompt identifying a recommendation for a proposed modification of the first set of transaction request characteristics to the second set of transaction request characteristics;
receiving from the first computing device, by the at least one processor, input changing the first set of transaction request characteristics of the transaction request to the second set of transaction request characteristics in response to the recommendation;
sending, by the at least one processor, the transaction request to a second computing device according to a transaction route of the second set of transaction routes;
receiving from the second computing device, by the at least one processor, transaction results regarding the transaction request;
performing, by the at least one processor, an analysis of the transaction results based, at least in part, on benchmark metrics associated with a set of transaction records;
generating, by the at least one processor, user interface instructions for display of the transaction results and the analysis of the transaction results using the benchmark metrics; and
sending, by the at least one processor, the user interface instructions to the first computing device for presentation.

* * * * *